United States Patent [19]

Fulton et al.

[11] Patent Number: 4,680,753
[45] Date of Patent: Jul. 14, 1987

[54] SYSTEM AND METHOD FOR CONTROLLING NETWORK BUS COMMUNICATIONS FOR INPUT-OUTPUT INTERLOCKING INFORMATION AMONG DISTRIBUTED PROGRAMMABLE CONTROLLERS

[75] Inventors: Temple L. Fulton, Elizabethon; William O. Perkins, Johnson City, both of Tenn.

[73] Assignee: Texas Instruments Incorporated, Dallas, Tex.

[21] Appl. No.: 719,174

[22] Filed: Apr. 3, 1985

[51] Int. Cl.$^4$ .............................. H04J 3/02; H04J 3/16
[52] U.S. Cl. .......................................... 370/85; 370/89
[58] Field of Search .............................. 370/85, 89, 96; 340/825.08

[56] References Cited

U.S. PATENT DOCUMENTS

| | | | |
|---|---|---|---|
| 4,058,681 | 11/1977 | Imaizumi et al. | 370/85 |
| 4,227,178 | 10/1980 | Gergand et al. | 370/85 |
| 4,511,958 | 5/1985 | Funk | 370/85 |
| 4,516,122 | 5/1985 | Tomikawa | 370/85 |

Primary Examiner—Douglas W. Olms
Assistant Examiner—Frank M. Scutch, III
Attorney, Agent, or Firm—John A. Haug; James P. McAndrews; Melvin Sharp

[57] ABSTRACT

A control system for controlling an industrial process includes a network of a plurality of distributed programmable controllers or nodes coupled serially to a communications bus on either a single or dual media by means of a shielded twisted wire pair cable. The programmable controllers are coupled to the bus through a communications module which uses a broadcast method to achieve peer-to-peer communications. One module of the network, designated as an active monitor, exercises exclusive supervisory control of the broadcast activity on the network. The active monitor polls each node coupled to the network and each active node responds by broadcasting unacknowledged data to all nodes in the network. The broadcast message of each node in the network is mapped directly into designated variable memory locations of each programmable controller on the network. The active monitor establishes a list of active nodes based on the responses to the poll and allocates a time slot to each active node to broadcast its data and on a cyclical basis continues to poll a different node each network scan to update the list. Fault tolerance is provided by either an active-passive monitor arrangement for the single medium embodiment or by a redundant medium connection for the dual media embodiment.

21 Claims, 27 Drawing Figures

SYSTEM AND METHOD FOR CONTROLLING NETWORK BUS COMMUNICATIONS FOR INPUT-OUTPUT INTERLOCKING INFORMATION AMONG DISTRIBUTED PROGRAMMABLE CONTROLLERS

BACKGROUND OF THE INVENTION

The present invention relates to control systems of the type having a network of distributed programmable controllers connected together through a communications link and, more particularly to a method and means for controlling high speed transmission of relatively small amounts of data among controllers used for transfer line applications or sequential processes which require interlocking among the programmable controllers.

Increasing usage of programmable controllers has resulted in two basic requirements for communications with the controllers, the first being known as SCADA or Supervisory Control And Data Acquisition and the second being known as TCC or Tightly Coupled Control across the controllers wherein data or input/output (I/O) information is transferred from one controller to another. Local area networks exist which are suitable for the SCADA function however, in general, these networks do not provide a cost effective means for the tightly coupled control function.

Programmable Controllers, such as the Series 500 family of PCs, manufactured and sold by Texas Instruments Incorporated, typically programmed in ladder logic, used for machine control, material handling equipment, and batch process control have been interlocked using cross wired word I/O modules. The Series 500 word I/O module of Texas Instruments, for example, can transmit or receive up to eight parallel 16-bit data words per PC scan and if wired with 16 wires can be used for interlocking data for a limited distance. However the need for providing 16 data lines for both input and output along with strobe and ground lines serves as an undesirable limitation on its usefulness from an economic standpoint.

Other prior art approaches in providing peer-to-peer interlocking of data include time division multiple access techniques in which a fixed amount of time is given to each PC to broadcast its data to a supervisory controller. This technique tends to be inefficient and inflexible since it does not conform to varying needs of the network. That is, for example, if certain PCs are coupled to the network but are not active at a given time, that portion of the scan dedicated to the inactive PCs is not utilized. Still other approaches involve collision detection techniques however these approaches have the disadvantage of having an unpredictable time scan. In many cases where peer-to-peer interlocking of data is used, for example where one is synchronizing the operation of machines, it is important to provide a predictable as well as a fast scan time.

SUMMARY OF THE INVENTION

It is therefor an object of the present invention to provide a method and a system for peer-to-peer interlocking of programmable controllers which is reliable, fast, predictable yet economical.

Another object of the invention is the provision of peer-to-peer communications for both discrete and process applications particularly useful for fast communication of a small amount of data among any number of stations from two up to preferably sixteen.

Yet another object is the provision of a method and system for maintaining system operation with minimal degradation in spite of failures in equipment on the network or network media.

Yet another object of the invention is the provision of a method and system for resolving broadcasting conflicts of units on the network.

Another object is the provision of a method and system for peer-to-peer communication which can be used with any computer system where it is desirable to send small amounts of data quickly and with a high degree of data integrity.

Still another object is the provision of a method and a system of peer-to-peer communication which efficiently utilizes the bus bandwidth on a continuing basis, can be employed with relatively long network distances and is amenable for use in factory environments.

Another object is the provision of peer-to-peer communications having jabberstop and watchdog features.

In accordance with these objects, and others, the present invention provides a control system and method for controlling an industrial process including a plurality of distributed programmable controllers (PCs) in a local area network connected to various devices and sensors and communicating with one another through a communications link or bus particularly adapted for factory environment.

According to a feature of the invention the network medium is a 124 ohm shielded twisted wire pair cable which can support up to sixteen nodes and covers a maximum network distance of ten thousand feet. Each node on the network includes a communications controller and a discrete line driver/receiver to achieve baseband communication at a data rate of 115.2 Kilobits per second.

According to a feature of the invention a broadcast bus is used with unacknowledged messages using a closed system and a bit oriented protocol. The protocol uses HDLC starting and ending flags with automatic zero insertion and deletion. Each node can transmit from one to sixteen words. The transmitting node generates a cyclical redundancy code (CRC) and appends it to a message and the receiving node checks the CRC code to validate the data.

A broadcast message frame includes a starting flag, a control/address field which identifies the type of frame, the intended recipient in the case of polls or time slot allocations (TSAs) and the source of the data in the case of a broadcast message, the word or words of data, each of two bytes, two bytes for CRC validation and an ending flag.

According to the invention the network is initialized to establish communications between all nodes present on the network and is thereafter maintained to assure each node the opportunity to transmit its messages and provide for the addition and removal of nodes without conflict. One node is selected by a switch as an active monitor to control the transmission of all nodes on the network.

According to one embodiment of the invention the active monitor designates one of the nodes to be a passive monitor to take control of transmission on the network in the event that network communications ceases for a selected time interval. All other nodes are nonmonitors which have no control over transmission on the network. At the time power is applied to the nodes on the network, the node which is selected by the switch as the active monitor (SAM) determines which of the n possible nodes are present on the network and assigns a non-monitor the role of passive monitor. The active monitor determines which nodes are present by issuing a polling command which is addressed to a particular node and in turn to all the nodes. This command instructs that node to broadcast its data message to all other nodes on the network. This command frame is very short since there are no data words included. All nodes which are active in the network receive this command and its response, if any. If the node responds to the poll, the active monitor will include the node in a list of active nodes which are to be granted the right to transmit on an equal priority basis. All other nodes create a list of active nodes based on the polling for use as an indicator of the network status.

Once the list of active nodes is built, the active monitor begins issuing commands known as time slot allocations or assignments (TSAs) to each listed node in turn, directing the node to broadcast its data. The TSA command frame is also a very short frame.

The active monitor maintains the network as a part of its normal operation. In addition to granting time slots for data broadcast to each node address contained in the active list, the active monitor polls each node address on a cyclical basis for the purpose of adding and removing nodes. If a new node is added to the network, the active monitor adds its address after polling the address and receiving a response. A node which is removed from the network is deleted from the active list when it fails to respond to a poll.

The active monitor maintains a list of active nodes and a pointer to the node address which is to receive the poll. The list of active node addresses and the pointed to node address are combined to form a list of the nodes to be granted a time slot or a poll. The active monitor then issues either a time slot or a poll to each node address in the combined list. The active monitor then changes the pointer to the next node address and modifies the list of active node addresses if there has been a change.

According to a second embodiment the nodes are provided with a dual media interface to protect against single node failures or cable breaks. In this embodiment no node is assigned as passive monitor. Instead, the active monitor determines which units are active on each medium and uses the medium with the greatest number of active nodes as the active channel. The active monitor issues a polling command on both network media. If a node whose address is contained in the active list fails to respond to a TSA, the active monitor immediately polls the node to correct the active list and to switch media if appropriate.

BRIEF DESCRIPTION OF THE DRAWINGS

The above description, as well as the objects, features and advantages of the present invention will be more fully appreciated by reference to the following detailed description of presently preferred embodiments in accordance with the present invention when taken in connection with the accompanying drawings wherein.

DESCRIPTION OF THE PREFERRED EMBODIMENT

Figure 1:
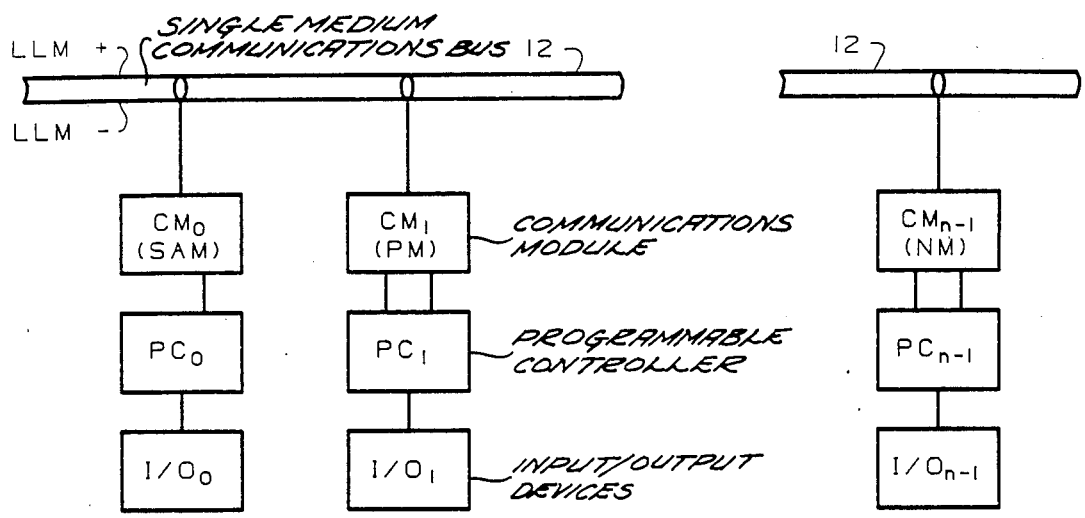
FIG. 1 is a schematic diagram of an exemplory process control system including a plurality of programmable controllers serially connected according to a first embodiment of the invention to a single medium communications bus through communications modules.

With reference to the drawings, an industrial control system in accordance with the present invention is shown in schematic form in FIG. 1 and includes n nodes or stations coupled serially to a communcations bus 12. Each station comprises a communications module $CM_o$–$CM_{n-1}$ which in turn is coupled to a programmable controller $PC_o$–$PC_{n-1}$. Each PC is provided with conventional input output devices $I/O_o$–$I/O_{n-1}$ to input data to the PC regarding the process, the data being processed by the PC to provide outputs to control the process as dictated by the program. In the preferred embodiments there are from two to sixteen stations which are adapted to exchange from one to sixteen data or input/output words with one another via communication bus 12 which is a 124 ohm shielded twisted wire pair cable up to ten thousand feet in length.

Although various PC controllers can be utilized with the invention it is particularly adapted for use with the series 500 programmable controllers including models 520 and 530 manufactured and sold by Texas Instruments Incorporated.

The communications module CM is a 3 word in—5 word out special function, non-programmable module capable of performing high speed block transfers. One output word is used to determine the starting address in PC memory where the data table is to be built. Three input words are used to report module and network status. 256 words of variable (V) memory are allocated in each PC memory on the network that has a communications module. These locations in V memory form a table of data that is accessed by the CM. An offset word provided to the module is interpreted as a 32 bit integer value and is used to access the first word of the data table.

The organization of the data table is shown in Table 1.

TABLE 1

| V MEMORY ADDRESS | V MEMORY DATA CONTENTS |
| --- | --- |
| OFFSET + 0 | STATION 1 — DATA WORD 0 |
| OFFSET + 1 | STATION 1 — DATA WORD 1 |
| OFFSET + 14 | STATION 1 — DATA WORD 14 |
| OFFSET + 15 | STATION 1 — DATA WORD 15 |
| OFFSET + 16 | STATION 2 — DATA WORD 0 |
| OFFSET + 17 | STATION 2 — DATA WORD 1 |
| OFFSET + 30 | STATION 2 — DATA WORD 14 |
| OFFSET + 31 | STATION 2 — DATA WORD 15 |
| OFFSET + 240 | STATION 16 — DATA WORD 0 |
| OFFSET + 241 | STATION 16 — DATA WORD 1 |
| OFFSET + 254 | STATION 16 — DATA WORD 14 |
| OFFSET + 255 | STATION 16 — DATA WORD 15 |

The size of the data table that is built in V memory is dependent upon the choice of the number of stations on the network, if fewer than sixteen stations are used, the amount of memory written can be reduced.

Figure 3:
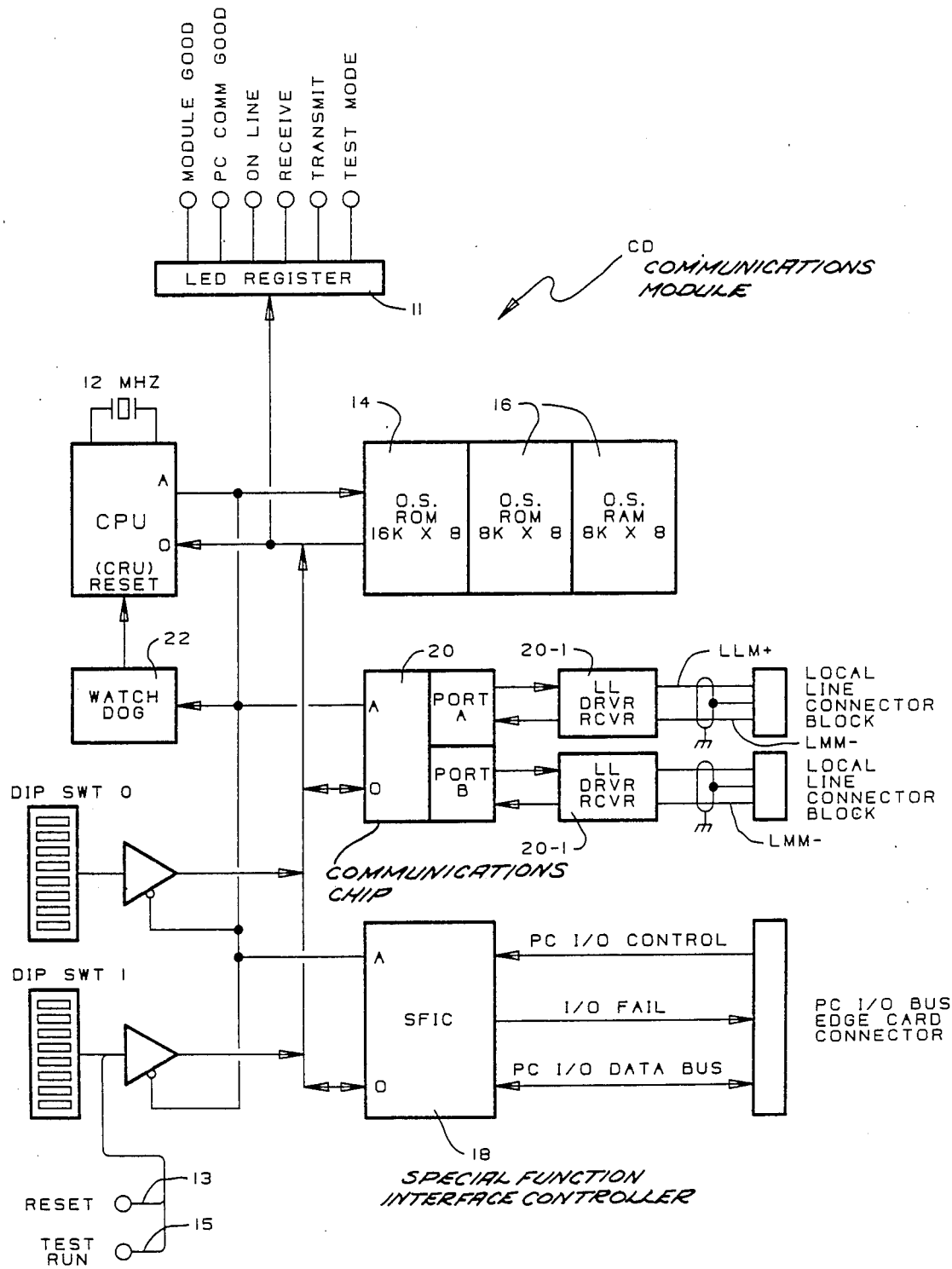
FIG. 3 is a schematic block diagram of a communications module according to the present invention.

With particular reference to FIG. 3 a communications module CM uses a central processing unit CPU which in the preferred embodiments is a TMS 9995 manufactured and sold by Texas Instruments Incorporated. The CPU is initialized by a hardware reset which is generated by the application of power, the rising edge of early power failure or a watchdog time-out condition. The CPU generates the system clock from a 12 mhz crystal which is divided by 4 to give a 3 mhz CLKOUT system clock. The CPU supports six interrupts: reset, interrupt 1, 2, 3, 4 and NMI. Interrupt 1 is a communications chip interrupt. Interrupt 2 is a MID interrupt used to catch invalid op-codes. Interrupt 3 is an internal timer interrupt with a time period that is determined through software control. Interrupt 4 is a special function interface controller SFIC interrupt and NMI is not used by the communications module. The interrupts will be discussed in greater detail below, particularly in relation to FIG. 13. The communications module uses both a memory data bus and a CRU bus for the CPU. The memory data bus interfaces to ROM 14, RAM 16, SFIC 18 and communications chip 20. The CRU bus interfaces to dip switches, DIP SWT 0 and DIP SWT 1, to indicator LED Register-11 and to communications card identifier lines.

Chip 20 is a serial communications chip (SCC) used in module CM and in the preferred embodiment is a Z8530A manufactured and sold by Zilog Inc. This chip supports serial communications over two independent channels port A and port B using bit or byte protocols at data rates up to 1 mega baud. In the preferred embodiment the data rate is 115.2K baud using asynchronous bit protocol. An external oscillator and clock multiplexer is used with chip 20 for clock generation. Chip 20 is mapped into the addressable memory space of the CPU and the two serial ports A and B drive the communication cards directly.

SFIC 18 provides the interface between the PC and the communications module. SFIC 18 contains 5 registers which are programmed by the CPU and read by the PC, 16 input bytes and 16 output bytes and 1024 bytes of dual ported RAM that is used for special function communications between the communications module and the PC. A more detailed description of SFIC 18 will be furnished below.

A watchdog timer 22 uses a free running oscillator/divider chip which has a time out period of approximately 367 milliseconds. In order to prevent expiration of the timer the CPU must clear the timer once every 300 milliseconds or faster.

The watchdog timer is connected to the RESET input of the CPU. If the timer fires indicating that something is wrong the module will be reset. Power up diagnostics are then performed and if the fault condition no longer exists, normal operation of the module will continue.

DIP switch 1 is an eight position switch used for test modes which will not be described herein. DIP switch 0 is a ten position switch and has switch definitions as set forth in Table 2.

TABLE 2

| | SWITCH POSITION | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| DIP SW 0 | UA0 | UA1 | UA2 | UA3 | W0 | W1 | W2 | W3 | A | R |
| | msb | | | lsb | msb | | | lsb | | |

| | |
| --- | --- |
| UA0–UA3 | Switches used to select network address of the module UA0 is the most significant bit. |
| W0–W3 | Switches used to select the number of words to be transmitted by the module. A selection of zero enables the module to transmit 16 words. W0 is the most significant bit. |
| A | Switch designates the module as the switch assigned active monitor (SAM). Only one such module is allowed on a network. 1 selects SAM operation. |
| R | Switch selects operation with or without redundant media. 1 selects operation with redundant media. |

Position 10 relates to operating the system according to two alternate embodiments of the invention. A selection of 0 results in operation according to the first embodiment whereas a selection of 1 results in operation according to a second embodiment (to be explained infra).

The module also includes an LED Register 11 to provide the user with an indication of its operation. In addition, a momentary push button (Reset) Switch 13 is used to effect execution of the reset or self-test based on the position of a toggle switch 15 movable between run and test positions.

Figure 4:
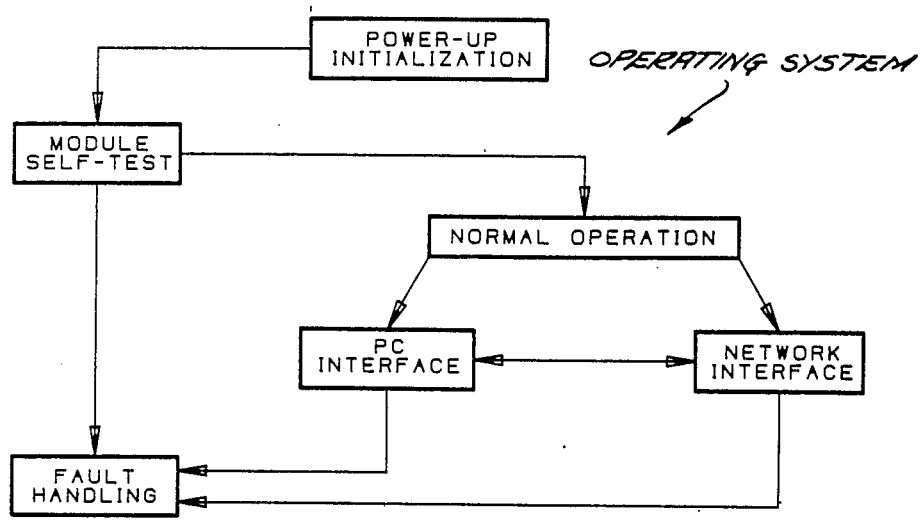
FIG. 4 is a block diagram of operating system software used with the communications module.

The operating system software, as seen in FIG. 4, controls the initializaiton of the module, network interface, PC interface and fault recovery. The network interface software is primarily interrupt driven but also has sections called by the execution loop.

Figure 5:
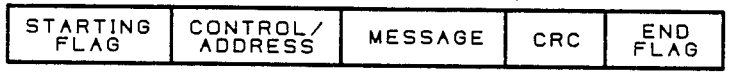
FIG. 5 depicts the format of a broadcast message frame.

Messages broadcast by the communications module are formatted as shown in FIG. 5. The start and end flags are HDLC flags (HEX 7E). The control/address field contains both control and station address information and comprises one byte. The message field comprises up to sixteen words of data. The CRC comprises two bytes of data that provide a method of data verification. The module uses the CCITT polynomial (International Consultative Committee on Telephone and Telegraph) preset to ones for CRC calculation. The order of transmission of the bytes within a frame is from least significant bit (LSB) to most significant bit (MSB). As used herein, the most significant bit is the lowest numbered bit in the byte.

Figure 6:
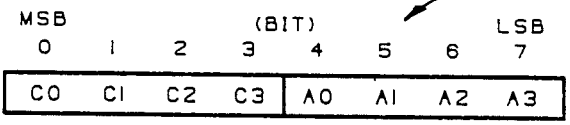
FIG. 6 depicts the format of the control/address field of the message frame.

The control/address field format is shown in FIG. 6. C0–C3 and the HEX designation form a control code defined in Table 3. A0–A3 form an address field that indicates the source of data broadcasts or identifies the station which has been given a time slot.

TABLE 3

| C0 | C1 | C2 | C3 | HEX | DEFINITION OF THE CONTROL FIELDS |
|---|---|---|---|---|---|
| 0 | 0 | 0 | 0 | 0 | Non-monitor station data broadcast |
| 0 | 0 | 1 | 0 | 2 | Code not used |
| 0 | 1 | 0 | 0 | 4 | Passive monitor data broadcast |
| 0 | 1 | 1 | 0 | 6 | Code not used |
| 1 | 0 | 0 | 0 | 8 | AM data broadcast or a time slot grant to a non-monitor |
| 1 | 0 | 1 | 0 | A | AM poll directing a non-monitor to broadcast all data |
| 1 | 1 | 0 | 0 | C | AM taking control, designating current to AM as PM |
| 1 | 1 | 1 | 0 | E | AM poll assigning a station the role of PM |

Figure 7:
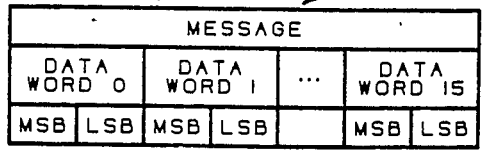
FIG. 7 depicts the format of the message field of the message format.

The format of the message field is shown in FIG. 7 in which Data Words 0–15 define the data that is broadcast to all active units on the network.

The communications modules CM are capable of operating in one of three different modes, as an active monitor (AM), as a passive monitor (PM) and as a non-monitor (NM).

Active monitors are characterized in that they supervise network communications and allocate time for the other CM to broadcast as well as broadcasting their own data. There is only one active monitor on a network in normal operation and it is assigned by means of dipswitch DIP SWT 0. This is a switch selected AM or SAM and it never assumes any other mode of operation.

Passive monitors are characterized in that they monitor the network and become active if the original active monitor fails. This condition is detected when the PM receives no transmissions for an interval of time called the Dead Bus Timeout (DBT) value. A passive monitor becomes a non-monitor when it hears another passive monitor on the network, when it receives command C or when it is reset. On a normal network there will be only a single PM which is assigned by the active monitor. A passive monitor that becomes an active monitor (PAM) returns to being a passive monitor when instructed to do so by the switch selected active monitor. The passive monitor broadcasts its data when so instructed by the active monitor.

Non-monitors are characterized in that they broadcast their data only when commanded (enabled) by an active monitor. A non-monitor becomes a passive monitor when so assigned by an active monitor but cannot become an active monitor directly.

At the time of power up each communications module executes a cycle reading all its own switches. Once this has been accomplished, the module will not reconfigure until the next time a power up occurs or the module is reset.

At the time power is applied to the nodes on the network the module which is designated as the switch selected active monitor after completing its self-diagnostics begins to monitor the network and determines which of the n possible modules are present in the network and assign a non-monitor node the role of passive monitor. The active monitor determines which nodes are present by issuing a polling command which is addressed in turn to each node. This command using the format shown in FIG. 5 and using a HEX control field of A or E instructs that node to broadcast its data messages to all other nodes on the network. The length of these data messages depends on positions 5–8 of DIP SW 0 selected for each module. The poll command frame is very short since there are no data words included in the transmission. All nodes which are active in the network receive this command as well as the response if the addressed node is active. If the node responds to the poll, the active monitor includes it in a list of active nodes which are to be granted the right to transmit on a equal priority basis. All other nodes create a list of active nodes based upon the polling for use as an indicator of the network status.

When the list of active nodes is built, the active monitor begins issuing commands to each node in turn, directing the nodes to broadcast their data. This command is called a time slot assignment or allocation (TSA) and has the same format as the polling command frame and therefore is a very short time frame. The active monitor broadcasts its own data in turn.

The active monitor maintains the network as a part of its normal operation. In addition to granting time slots for data broadcast to each node address contained on the active list, the active monitor polls each node address (including those not on the active list) for the purpose of adding and removing nodes. If a new node is added to the network the active monitor will add the new node's address after polling the address and receiving a response. A node which is removed from the network is deleted from the active list when it fails to respond to the poll addressed to that node.

The active monitor issues a poll to each of the n possible network addresses in a cyclical basis. The active monitor maintains a list of active nodes and a pointer to the node address which is to receive the poll. The list of active node addresses and the pointed to node address are combined to form a list of the nodes to be granted a time slot or a poll. The active monitor then changes the pointer to point to the next node address to be polled and modifies the list of active node addresses if there has been a change.

When the active monitor issues either a TSA or a poll to the node address of the passive monitor and the passive monitor fails to respond, the active monitor immediately reassigns the roll of passive monitor. The poll is still used to determine whether the node is to be removed from the active list.

Figure 8:
FIGS. 8–10 show various scan types for the first embodiment of the invention showing only commands and addresses for purpose of illustration.
Figure 9:
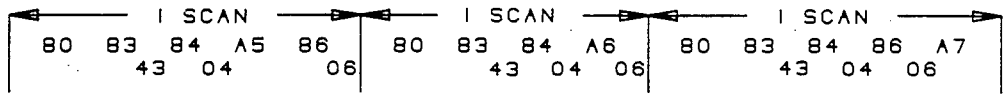
Figure 10:
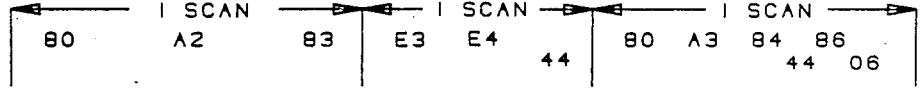

With reference to FIGS. 8–10 several scans are shown depicting the above described operation. Only commands and addresses in HEX are shown for purposes of simplicity.

Figure 14:
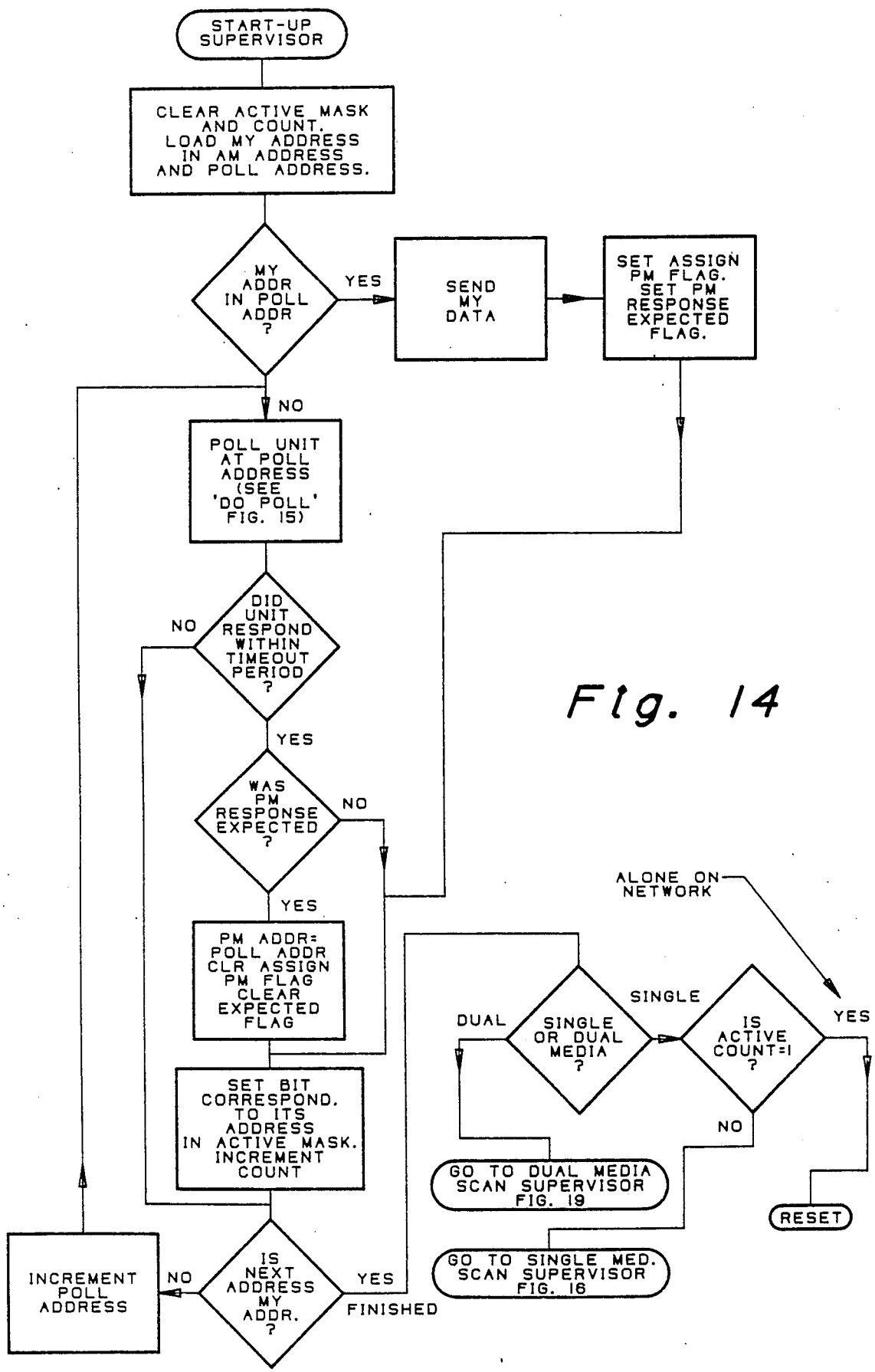
FIGS. 14–19 shows truth charts relating to the operation of the communcations module.
Figure 15:
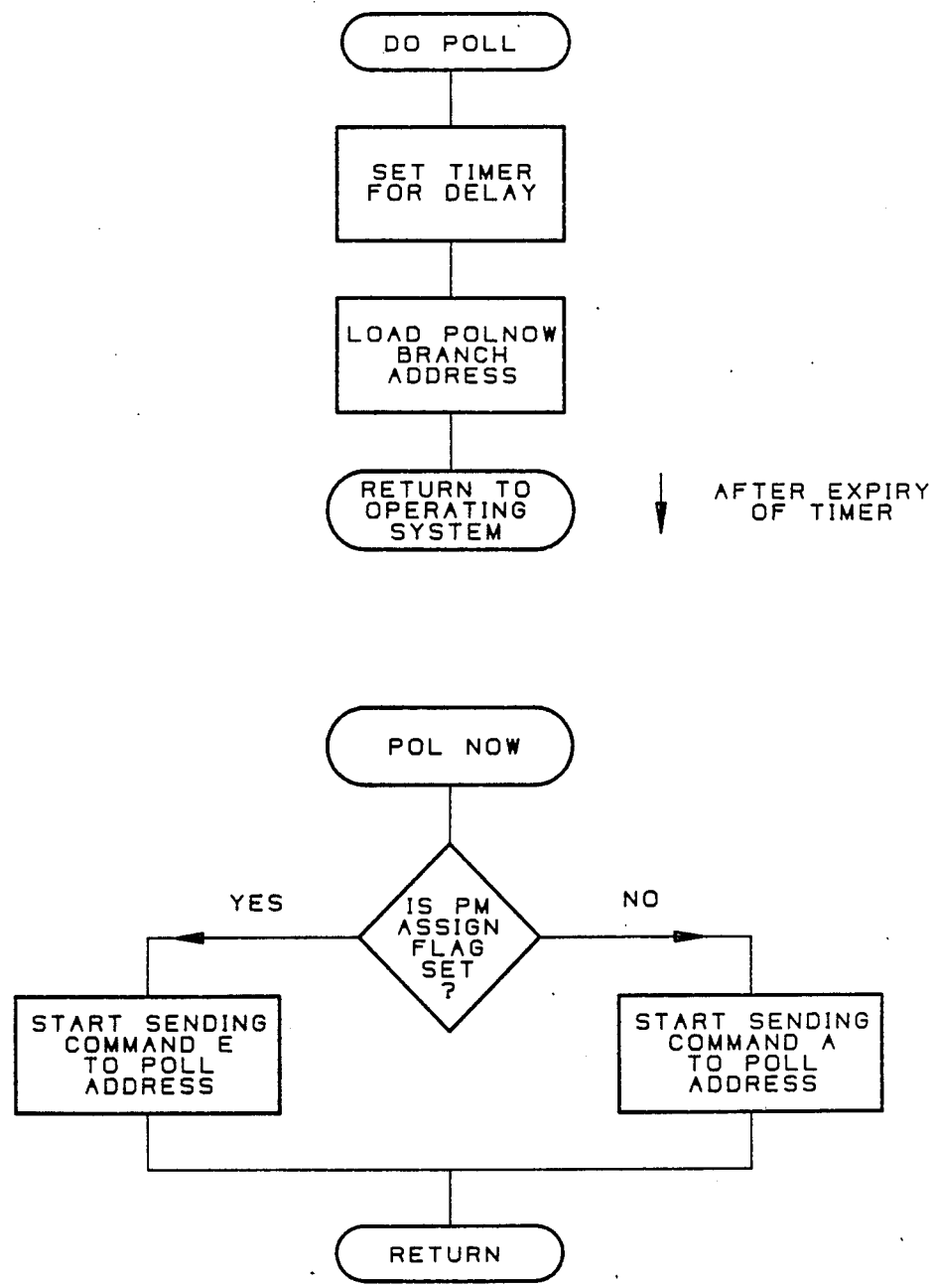

FIG. 8 (see also the truth chart for start up supervisor shown in FIG. 14) shows a start up scan with the SAM address of 0 and other units active on the network of 3, 4 and 6. The top line includes the commands and address fields issued by the active monitor while the lower line includes the command and address fields of the responding units. It will be seen that in this figure that the active monitor first has broadcast its own data (control 8) and then has tried to assign the roll of passive monitor using command E to nodes 1 and 2 before successfully assigning it to node 3, node 3 responding with control 4. Thereafter active monitor issues command A (see also FIG. 15-Do Poll Truth chart) which is a poll command directing each non-monitor to broadcast its data and nodes 4 and 6 in turn broadcast their data using control 0.

Figure 16:
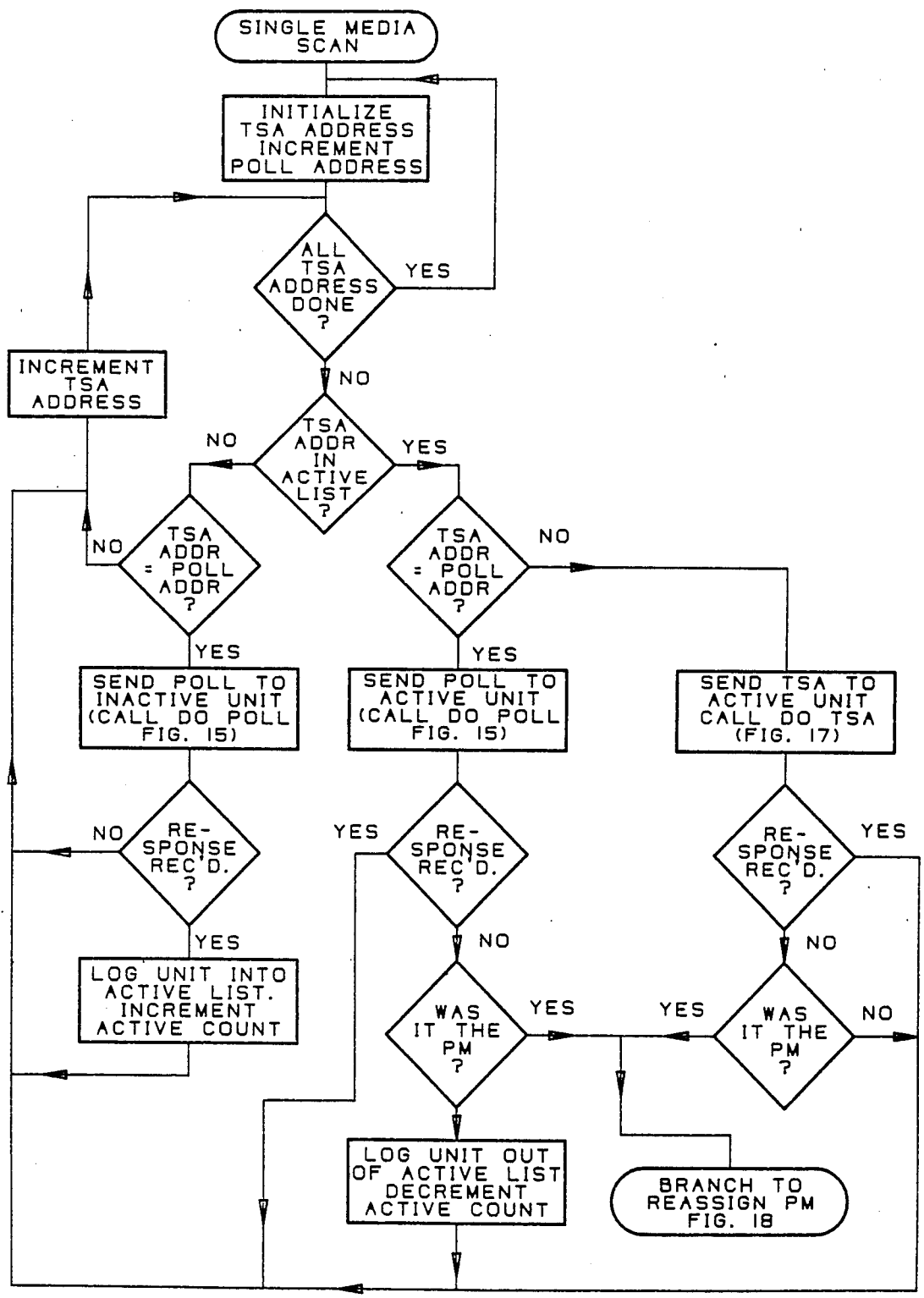
Figure 17:
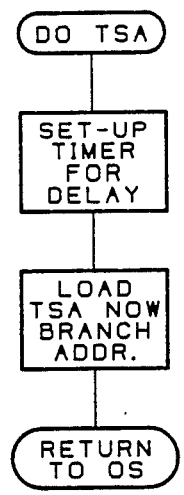
Figure 17:
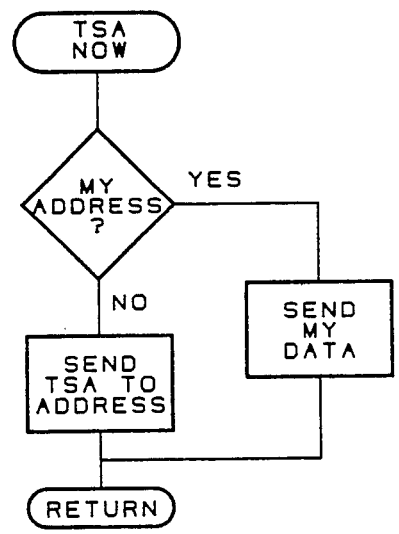

In FIG. 9 (see also the truth chart for single media scan shown in FIG. 16) three scans during normal operation are shown with the active monitor starting in the first scan its cyclic polling with node 5 and thereafter broadcasting its own data and issuing time slot grants (see also FIG. 17-DO TSA truth chart) to non-monitors (command 8) with passive monitor 3 responding using control 4 and non-monitors 4 and 6 responding using control 0. The following scans are identical except for the address of the poll node being stepped through other nodes, i.e., nodes 6 and 7.

Figure 18:
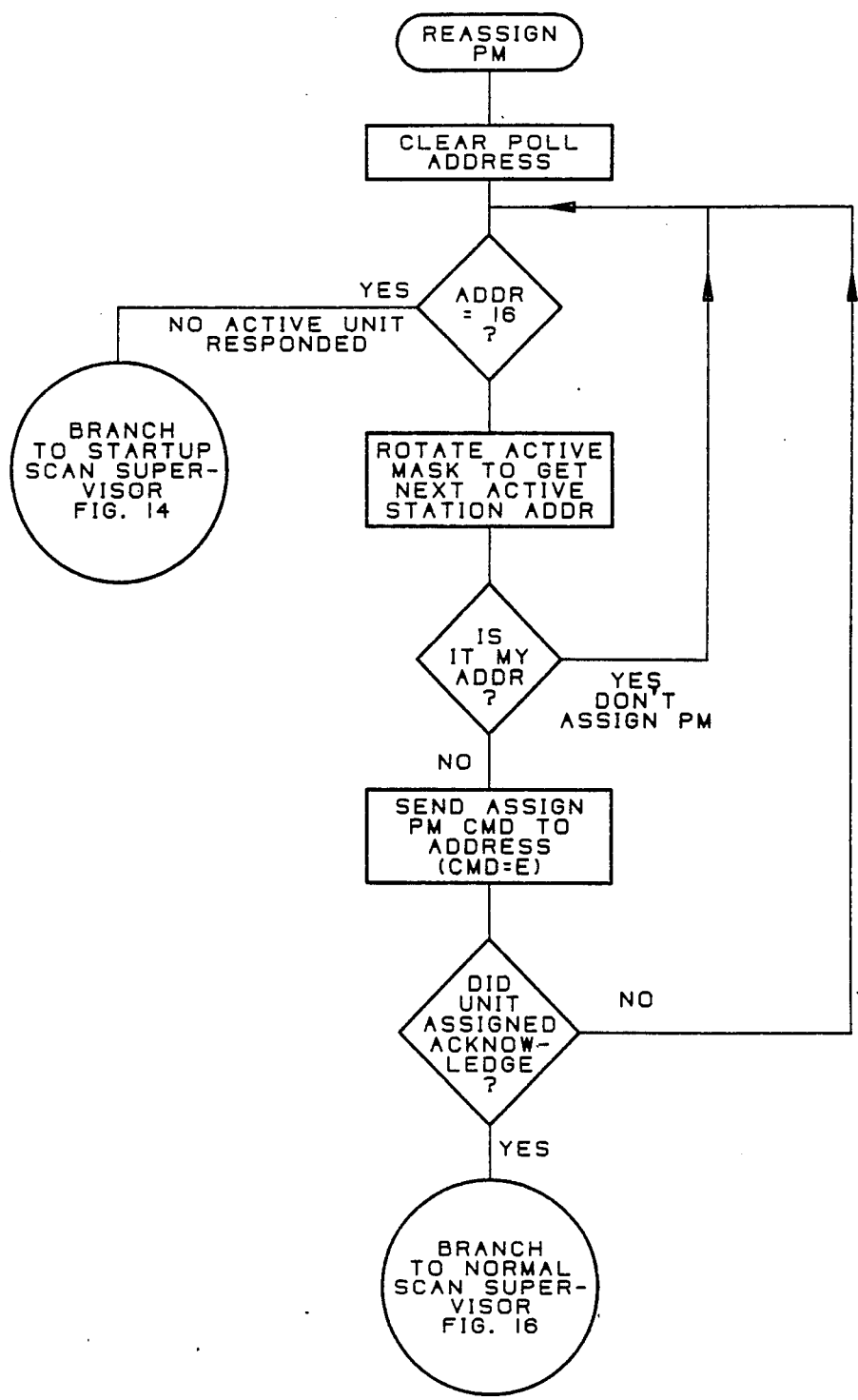

FIG. 10 (see also the truth chart for reassign PM shown in FIG. 18) illustrates a situation in which the passive monitor, node 3, does not respond to its time slot allocation. As will be noted in the first scan, the active monitor has issued a TSA (control 8) to node 3 (see also FIG. 17) and when it does not respond within the receive time out interval, the AM issues a command to node 3 attempting to reassign it as passive monitor (command E) in case its response was missed due to interference and failing to receive a response issues the same command to node 4 which responds accepting its roll as the new passive monitor and broadcasting its data. The next scan is then normal with nodes 0, 4 and 6 active on the network.

Fault tolerance is provided in the single medium embodiment of the invention in protecting against single nodes failures or cable breaks which would normally halt network operations. The active monitor assigns each node (starting with its own node address plus one and wrapping around from n−1 to zero) the role of passive monitor. The first node to respond accepts the role of passive monitor. Thus the network can be arranged for optimum fault tolerant protection due to cable breaks. For example, if the switch selected AM has an address of 0 and is located at one end of the network the node with the address 1 should be located at the opposite end of the network. In the event that the active monitor fails the passive monitor would assume the role of active monitor (PAM) and assign another node the role of passive monitor. This arrangement is optimal for a single cable break since both pieces of the network will have either an AM or a PM and both will continue independent operation. That is, in the event of a break between the two extremities, the passive monitor will cease to hear network communication and will assume the role of active monitor and assign a new passive monitor, as will the switch selected active monitor in its end of the network when its former passive monitor does not respond.

Should the cable fault be repaired collisions will occur since two nodes are acting as AMs. These collisions result in garbled messages where the CRC checks do not match. The network protocol results in any active monitor removing itself from the network after three consecutive CRC errors and executing a node reset. Since only one node is designated as the active monitor by switch selection the only node to continue acting as active monitor after a reset will be the switch actuated active monitor. Network operation then continues in normal fashion.

Collisions can also occur when the active monitor node fails and the passive monitor takes over as active monitor. When the SAM is repaired and returned to service, collisions would occur if the SAM were to take over control of the network immediately. In this case the network protocol directs that the SAM listen for network activity. If no activity is detected, then it initiates network communications. If such activity is detected, the SAM waits for the PAM to issue a poll to the address of the SAM. When this occurs, the SAM responds by issuing a command C which cancels all prior assignments of the roll of passive monitor and assigns the node which issued the poll command the role of passive monitor. Network communications then proceed in normal fashion.

Figure 20:
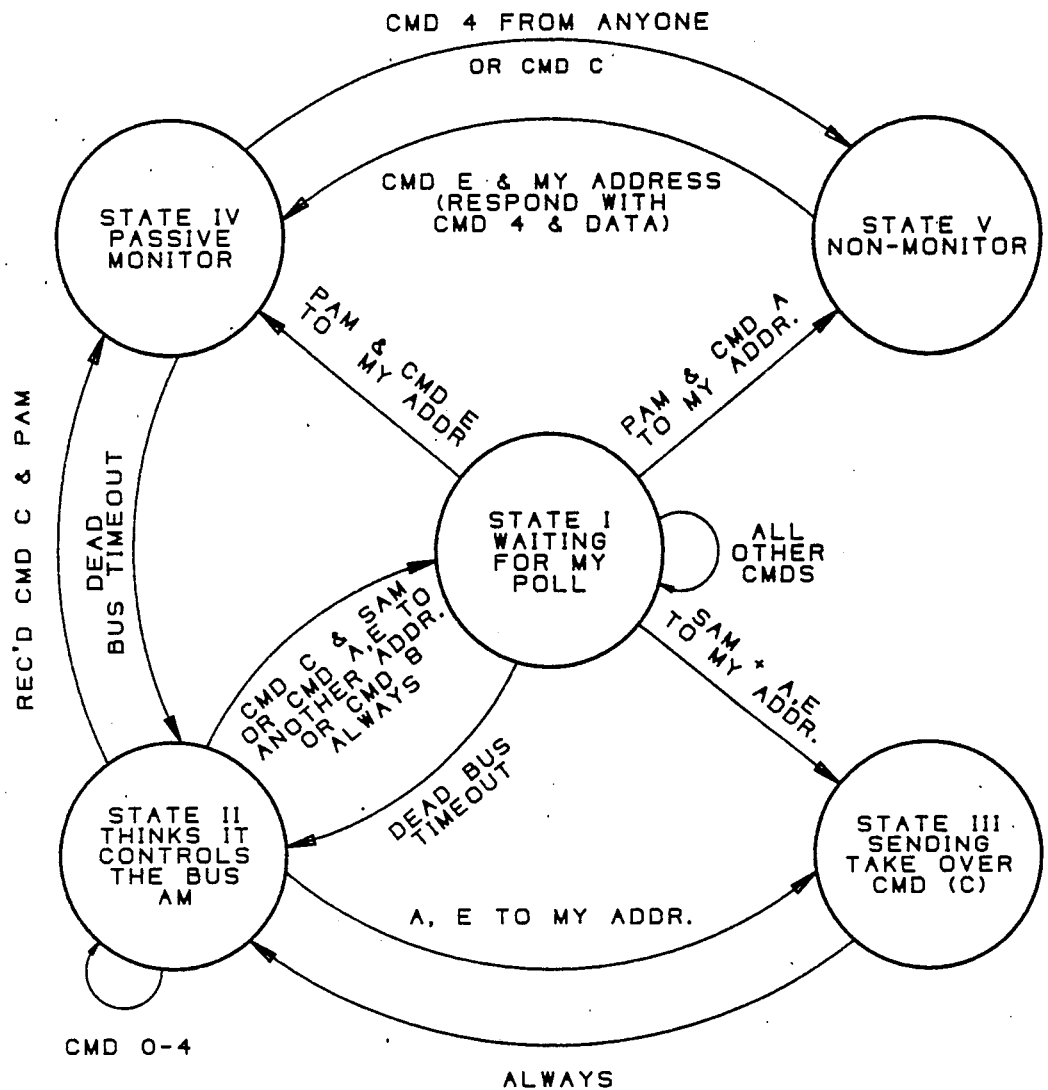
FIG. 20 is a state diagram for resolving multiple monitors.

Various conflicts regarding the roles of the nodes are resolved as shown in FIG. 20. When nodes first power up, they will be either non-monitors, NM, state V or the switch selected active monitor, SAM, state I. In normal operation there is only one AM and no transmissions take place until the SAM initiates them. Thus the dead bus time out will occur and the SAM will transition to state II, start communications and assign a passive monitor PM causing an NM to transition from state V to state IV. No further state transitions occur unless something goes wrong.

Should a SAM lose power communications will cease for the dead bus time out interval causing the PM to transition to state II and resume communication. The PAM assigns a new PM as before, causing a V to IV state transition in the node assigned. The network then runs normally, minus one node. When the SAM recovers power, it will be in state I but the bus is not dead and there is not time out. The SAM waits until it receives a poll to its own address and responds with a command C. This causes a II to IV transition in the PAM, and cancels the other PM, while the SAM moves to state II and begins communications. The SAM immediately assigns a new PM. Whenever a PM receives a command to its address, it responds with a command 4 and data. Command 4 always causes a IV to V state transition in all PMs except the one to which the command was sent, leaving only that node as PM. Again the network is operating normally.

Should there by a cable break between the AM and the PM two independent networks result as described above and when the cable is reconnected there are two nodes in state II and possibly two nodes in state IV. The nodes in state II will sometimes collide, sometimes hear collisions from responding units, sometimes hear each other and sometimes hear normal transactions as well. When any node receives three sequential CRC errors, it will reset itself and when it resets it reverts to state V unless it is the SAM which reverts to state I. The SAM, but not the PAMs, will also reset if it polls all units on the network without getting a valid response. As stated above in connection with power loss, whenever a SAM resets it regains control. When either of the AMs hear three consecutive collisions (CRC errors), they will reset. If one resets, the other is left in control. If both reset, either the SAM will take control when it recovers or a PM will take control while the SAM is resetting and surrender control when the SAM recovers as above. If the SAM hears responses to the other AM, they will not be the proper response to the command the SAM sent and will be ignored. If all units are polled this way, the SAM will reset and take over. More likely one of the AMs will receive a poll or a TSA from the other before this happens.

When an AM receives commands A, E, 8 or C, it cannot be the only AM on the network so special action is required. The takeover command C always causes a II to IV state transition for PAMs as stated above. Polls and TSAs to other units also cause a response from these nodes if they are on line. So the receiving AM would cause an unintelligible collision if it were to send a command at this time. Instead, such receptions will cause a transition to the wait state I in the receiving AM in order to avoid collisions and hasten recovery.

Since each node has a unique address there is less danger of a collision when an AM receives another AMs request to the receiver's own address so the receiving unit will resolve monitorship with its response at that time.

While in the wait state I, if a SAM receives a command to itself, it responds with the takeover command C and resumes control. If a PAM receives a PM assignment, command E to itself it becomes a PM again (state IV) and responds with command 4. If it receives an A command instead, it reverts to an NM (state V) and responds with a command 0. The latter two transitions leave control to the current AM.

When a SAM is in state II and receives an A or E command, its response is to send command C (shown as a transition to state III) and resume control of the network. The other AM will become PM if a PAM or go to the wait state I if a SAM in order to regain control later when its own poll is received.

The reception of an 8 command by an AM could also be handled the same way as commands A and E if desired however in the preferred embodiments it was found more conducive to implement a transition to the wait state I leaving resolution to the next time the waiting unit was polled.

Many combinations of transitions are possible depending upon the number of nodes, the location of the break and the relative timing of commands on the independent network segments but the reset conditions and the wait state insure that all combinations eventually resolve to one active monitor and since any PM response eliminates all other PMs, resolution to one PM is also assured.

Figure 2:
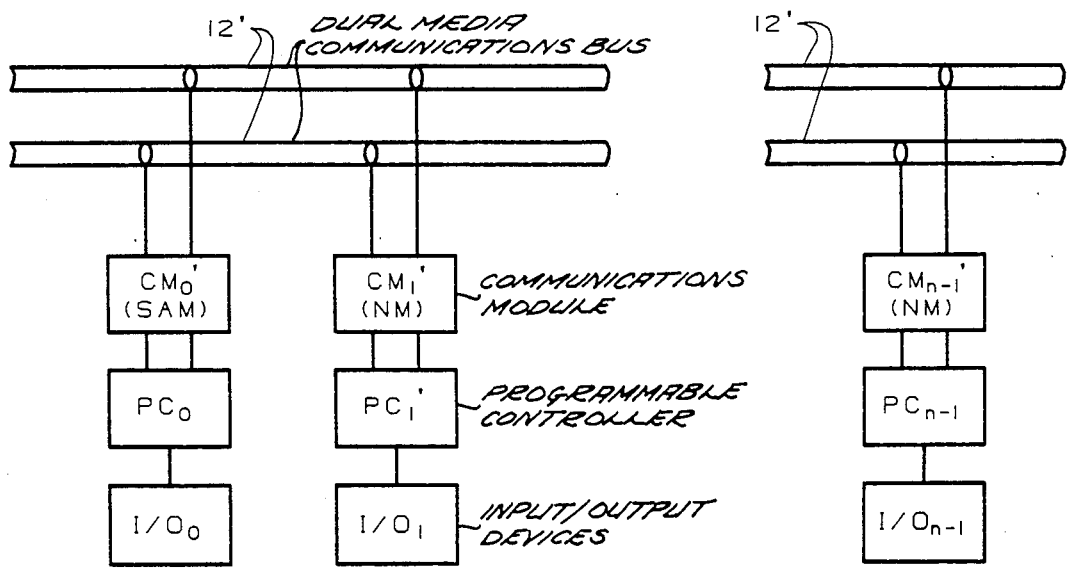
FIG. 2 is a schematic diagram, similar to FIG. 1, of such a system in which the programmable controllers are serially connected according to a second embodiment of the invention to a dual media communications bus through a communications controller having dual ports.

With reference to FIG. 2 a second embodiment of the invention will be described. The communications modules CM are provided with dual ports and if the DIP switch 0 position 10 of DIP SWT 0 is selected as 1, the modules will be operable with redundant media. Thus port A of communications chip 20 is coupled through a local line connector block to one medium of communications bus 12' and port B of chip 20 is coupled through a similar block to the other medium of the twisted pair cable. The several CMs ($CM_0$-$CM_{n-1}$) are serially connected to each medium of the bus as in FIG. 1. Operation of this embodiment is similar to that of the first embodiment and the description will be limited to differences between the embodiments.

In the redundant media version the communications modules are either active or non-active, there being no passive monitor mode of operation. The active monitor is selected by DIP SWT 0 (position 9) and only one active monitor can be selected for a given network. In the dual media interface the active monitor determines which nodes are active on each medium and uses the medium with the greatest number of active nodes as the channel on which communications are directed (or channel A if the number of nodes on each channel are equal). A poll is issued on both network media. Should a node whose address is contained in the active list fail to respond to a TSA, the active monitor immediately polls the node on both media. If the node still does not respond, the active monitor continues the cycle by returning to the primary medium. If the node does respond in the secondary medium, the active monitor concludes that a failure in the primary medium has occurred and switches to the secondary medium. Thus fault tolerance by means of the dual media interface protects against a cable fault and against driver-receiver failure at a node. In the event of such a failure, communication is maintained by switching to the alternative medium. Each node maintains a list of active nodes for each medium based on the response to the poll issued by the active monitor. This list can be used to help troubleshoot the network or to indicate a failure condition so that appropriate action can be taken to avoid loss of network communications. Removal of a node from a dual media network will not cause the active monitor to switch operation to the alternate medium since the balance of the number of active nodes is not upset by removing the node from both media interfaces.

Figure 11:
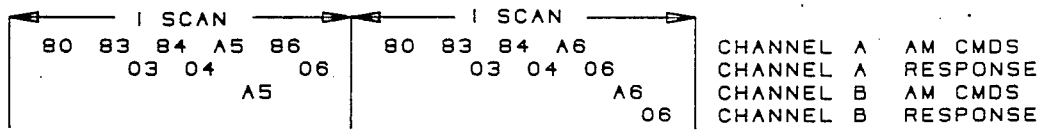
FIGS. 11 and 12 are similar to FIGS. 8–10 and show scan types for the second embodiment of the invention.
Figure 12:
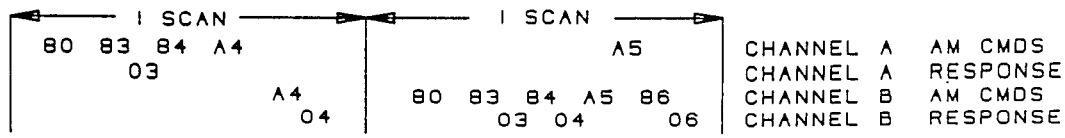
Figure 19:
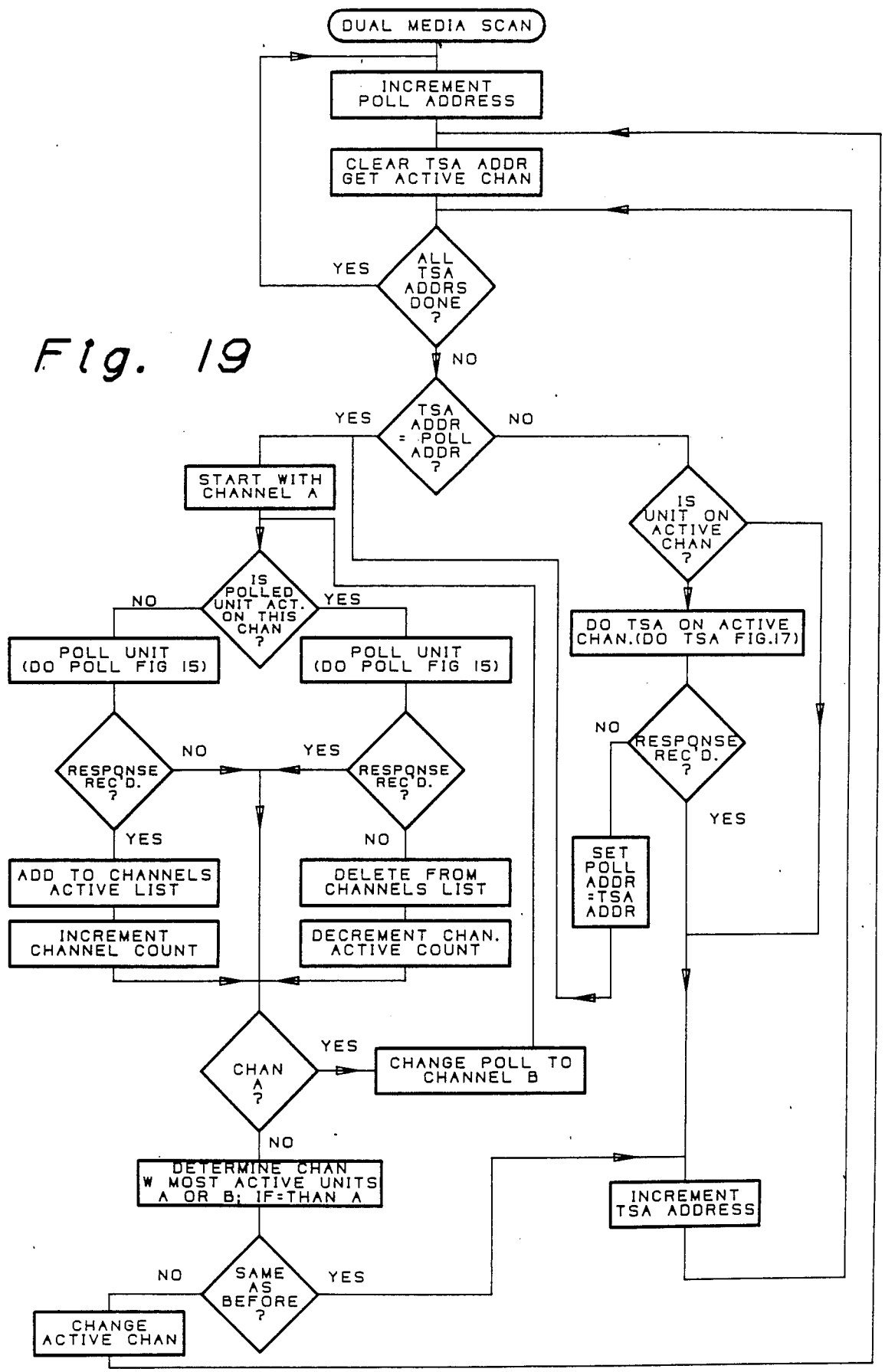

With reference to FIG. 11 (see also truth chart for dual media scan shown in FIG. 19) two normal scans are shown for an AM having an address of 0 and three other units on the network 3, 4, and 6. It will be noted that the poll command A is sent on both media. In FIG. 12 node 4 fails to respond to its TSA on channel A so that a poll command is sent on channel A and then on channel B. A response in channel B causes a media changeover to channel B for all the nodes.

The network communication interrupt structure will be described with particular reference to FIG. 13. The system hardware is configured such that the serial communications chip 20 (SCC) generates a level 1 interrupt when it receives a character or when it finishes transmitting a character. A receive interrupt, e.g. FIG. 13b, starts the next transmission in order to have fast, deterministic communication. Thus all communications are interrupt driven. This presents a problem in two cases; how to start the system, and how to get back to the communications software if an expected reception does not occur. It is also desirable to insert some delays between transmissions to allow the operating system to do its work of transferring data to the sequencer. The hardware timer is used to time this delay so the software is free during the delay interval. The hardware timer (FIG. 13c) will generate a level 3 interrupt when the programmed interval expires. Here again, the level 1 communications code must be accessed.

The invention accomplishes direct branching to level 1 by creating "false interrupts." The normal interrupt in the CPU automatically changes the interrupt mask to the proper level and does a call to the interrupt vector. Any return after an interrupt is performed automatically and restores the interrupt mask to its previous value, which was saved by the CPU hardware. In the false interrupt, the interrupt mask is changed to the correct values by software before and after a call to the routine in the other interrupt level. This allows level 1 code to be started from the OS or accessed by the timer interrupt service routine (ISR).

Figure 13A:
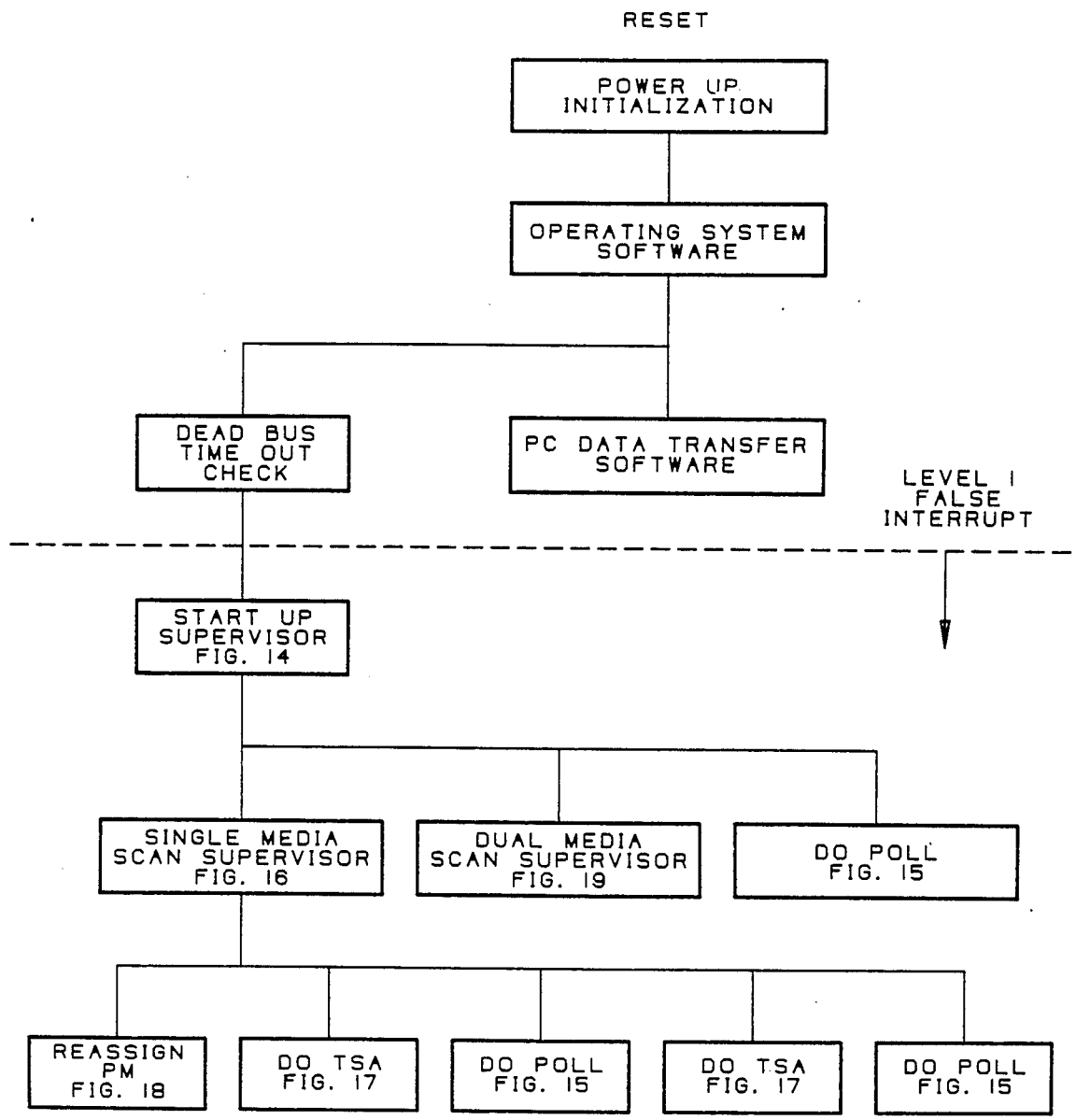
FIGS. 13a, b, and c are schematic diagrams showing communications hierarchy.
Figure 13B:
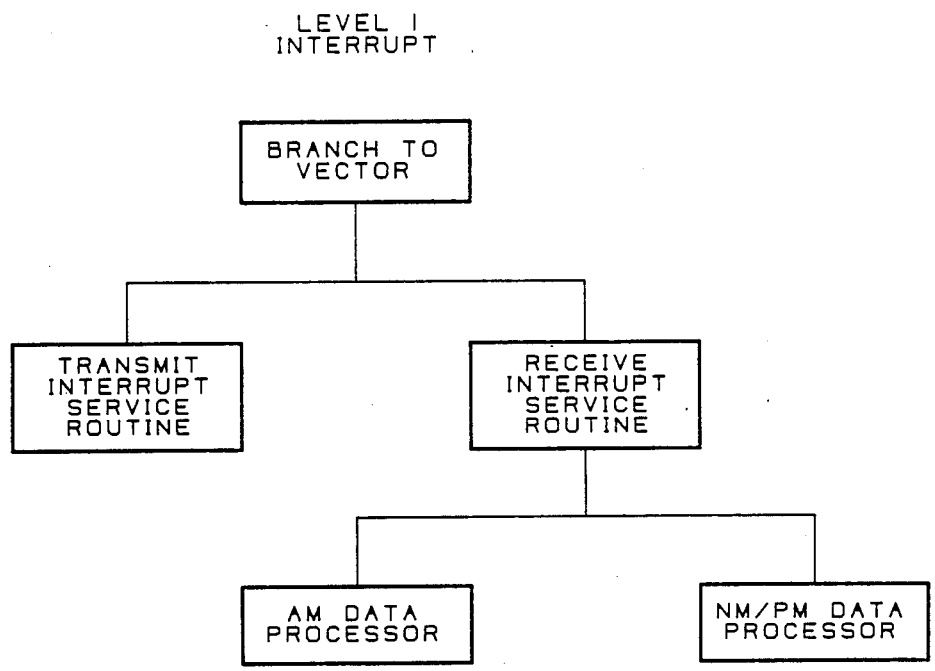
Figure 13C:
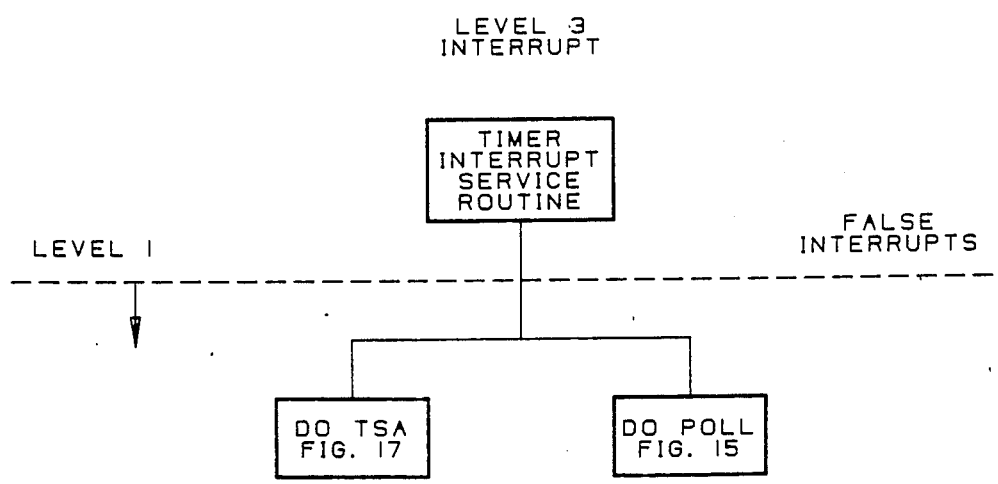

Referring to FIG. 13a, on power-up, each module initializes itself and begins communications with the PC. When the dead bus timeout interval expires, the module which checks this will mask all interrupts and call (false interrupt) the startup supervisor in the AM unit only. The start-up supervisor (see FIG. 14) calls the Do Poll module (FIG. 15), which sets up the hardware timer to do a delay and stores the vector to which it should branch at the end of the delay. Then Do Poll returns to the timeout checker, which restores the interrupt mask and returns to the executive. The first false interrupt is complete.

When the delay expires, a normal level 3 interrupt passes control to the timer ISR. This routine masks all interrupts and calls to the vector stored in Do Poll. Do Poll then sends the first byte of the command to the SCC 20 and returns to the timer ISR, which restores the interrupt mask to the level 3 value and returns to the OS. The second false interrupt is complete.

When SCC 20 has shipped the byte out of its input buffer, it will generate a level 1 interrupt. The transmit ISR will load the next byte and return. This continues until the last byte is sent. The transmit ISR then initializes SCC 20 to receive, sets up the timer to do a receive timeout, and returns.

If the receive does not occur within the timeout period, the timer generates a level 3 interrupt which does a false interrupt to the startup supervisor (the address for this branch was saved when Do Poll was called) with a flag telling the supervisor that the unit did not respond. The supervisor then calls Do Poll to send a poll to the next unit. When Do Poll sets up the delay and returns, it returns to the timer ISR, which corrects the interrupt mask and returns to the OS. The next poll will take the same paths as the first.

If the receive does occur within the timeout period, the SCC generates a level 1 interrupt which branches to the receive ISR. This routine stores the first data byte and sets a flag telling the timer ISR to simply return to the OS when the timeout internal expires. The receive ISR then returns. Each byte received causes this process to repeat until the end flag indicates the end of the message. Then the receive ISR branches to the AM receive processor, which stores the data if the CRC is good and branches back to the start-up supervisor (to the same location that the timer ISR branches on timeouts) with the response received flag set. If the CRC is bad, the response receive flag is cleared. Control does not return to the OS until the next send delay is programmed and Do Poll returns.

Once start-up is complete, the scan supervisor is accessed in the same fashion as the start-up supervisor, and the Do TSA module (FIG. 17) is accessed like the Do Poll module.

In NM/PM units, no start-up is required. The first AM command received goes through the receive ISR to the NM/PM data processor, which determines if it should store data, respond, or do nothing. If the command requires a response, the data processor sends the first byte and returns, leaving the rest to the transmit ISR. At the end of the response, SCC 20 is initialized to receive. The timer is not programmed by NM/PM units. Note that PMs become AMs in the dead bus checker if the AM has stopped communicating. Otherwise there are no false interrupts in NM/PM units.

Figure 21:
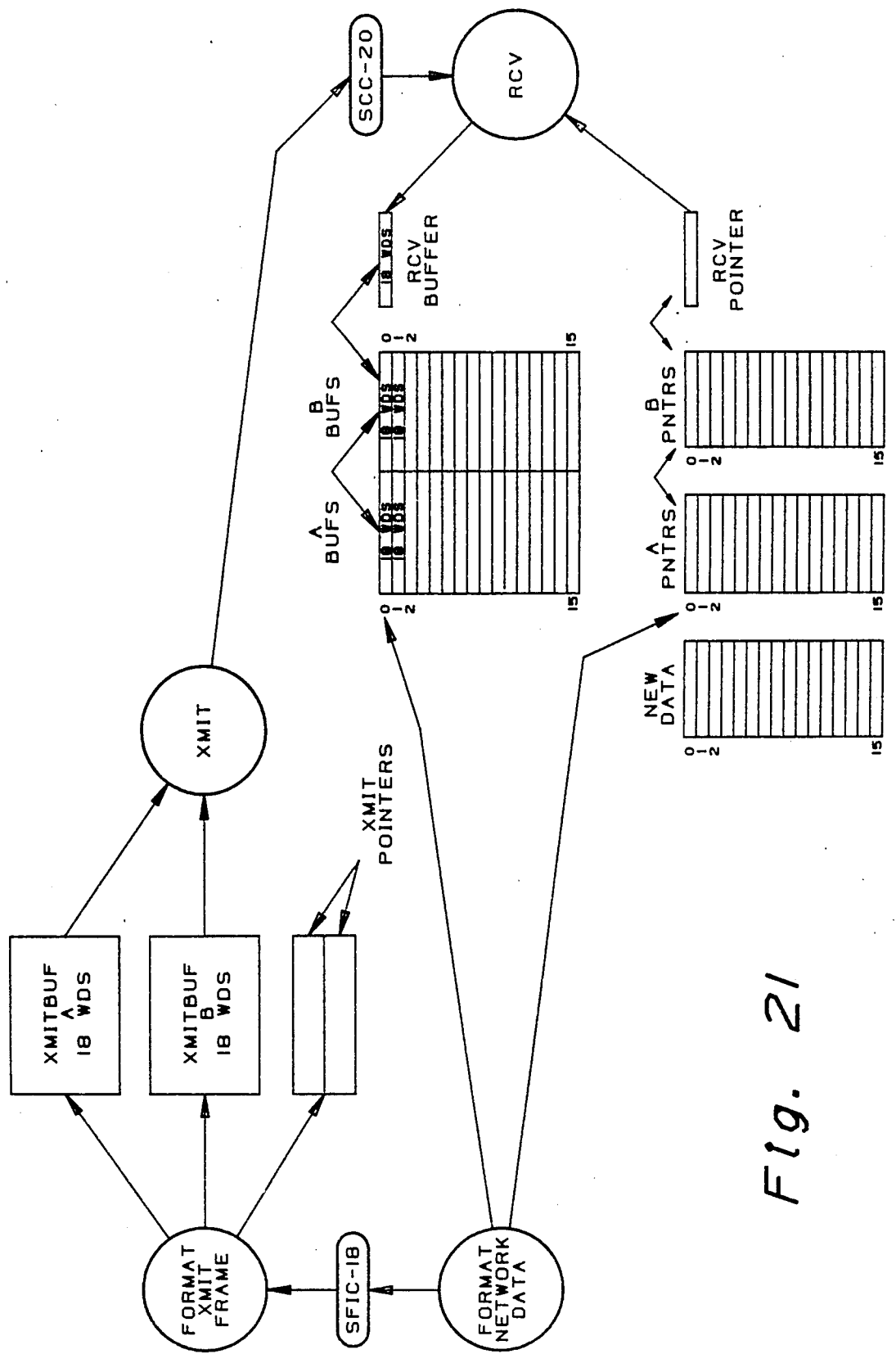
FIG. 21 is a data structure diagram for the communications module.

Multiple buffers allow the asynchronous operation of the network interface and the PC interface. The operation of the buffers for data directed from the network to a PC and from a PC to the network are shown in FIG. 21. Data frames from the network are loaded in a Receive Buffer until the CRC and length are verified. When the data is determined to be good from a particular node, e.g. N, the pointer to that Receive Buffer is swapped for the pointer to the old node N buffer. The New Data Flag is then set for the new node telling the operating system that new data is available. If the CRC or length is not good, then no buffer swap takes place, the bad data is not used and the same buffer is used for the next frame received.

When the operating system begins to fill the SFIC 18 for the PC transfer, it first checks the New Data Flag for each node. If the flag is set the buffer pointers are swapped between the operating system and the receive buffer handler and the flag is cleared keeping the most recent data in the SFIC chip 18.

When data is read from the SFIC RAM the operating system writes the data into one of the two transmit buffers. Then the operating system checks to see if the transmitter is using the transmit buffer and waits until the buffers are not busy. Then the operating system swaps the transmit routine buffer with its own giving the routine access to the new data the next time it is needed.

With this structure buffer pointers are swapped between the interrupt service routine (ISR) and the operating system and no data is copied or moved around.

Figure 22:
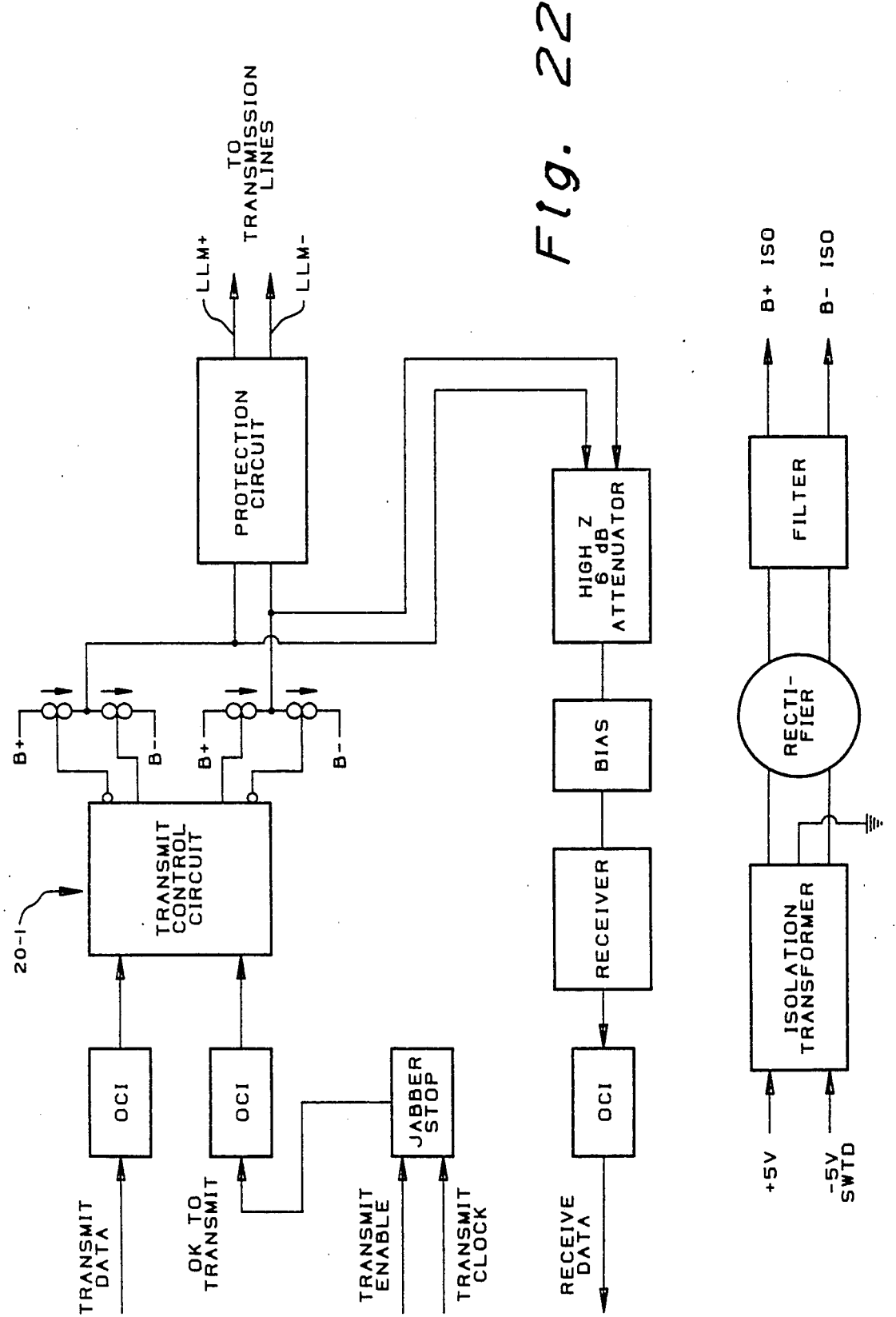
FIG. 22 is a block diagram of the line driver/receiver used with a communications chip of the module and shown in FIG. 3.

FIG. 22 shows a block diagram of the local line card circuitry. Serial data to or from the serial communications controller SCC-20 is buffered and isolated through optically coupled isolators OCI. The transmit data from the isolator is converted from voltage source drive to current source drive by dual tri-state differential line drivers and goes through a protection circuit (to handle spikes, which it routes to the power supply and ground) to the transmission lines. Receive data is attentuated 6 dB by a high impedance attentuator, amplified and fed to the SCC-20 through another opto-isolator. Each local line card is biased due to the possibility of random noise being read as a flag. That is, in the dual media embodiment a break in the cable could cause an interrupt on the channel attached to the break even though the module was communicating on the other channel. The internal bias obviates this problem.

Also coupled to the transmit control circuit is a jabberstop circuit which prevent faults due to failure in the control of line drivers from bringing down the network. If the transmission of a single frame exceeds a selected number of bits, in the preferred embodiment 4,096 bits, the circuit will disable the drivers.

The outputs of the line drivers are connected to the two wires of the shielded twisted pair communications bus labeled LLM+ and LLM−. The line driver sources current to the LLM+ line and sinks current from the LLM− line for one signal state and the opposite for the other.

An isolated ±5 volt unregulated power supply provides power for the line drivers and receivers.

Figure 23:
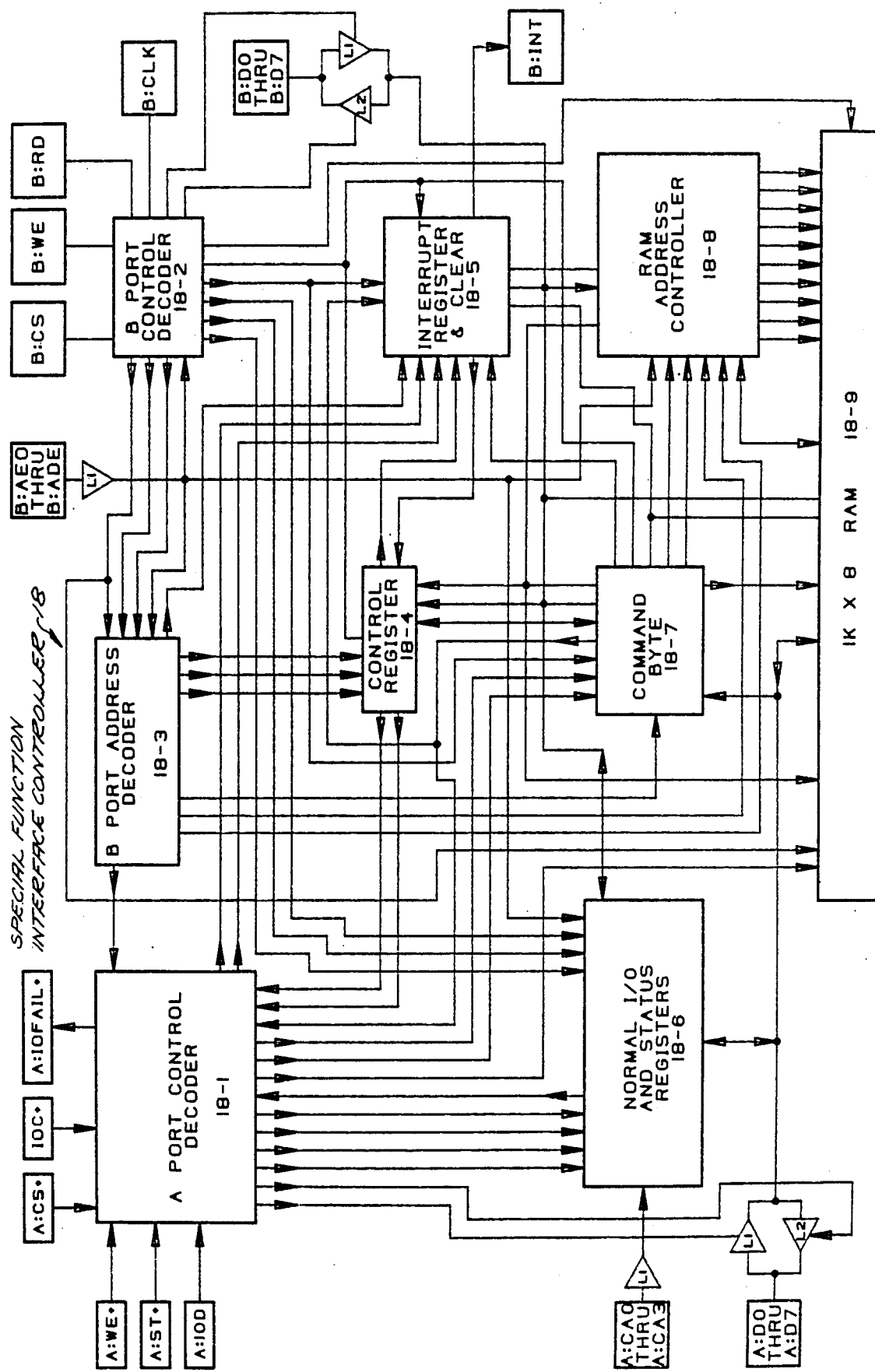
FIG. 23 is a block diagram of the special function interface controller SFIC used with the communications module and shown in FIG. 3.

FIG. 23 shows a block diagram of the special function interface controller, SFIC 18 which in the preferred embodiment is a digital NMOS integrated circuit. SFIC includes A Port Control Decoder 18-1 coupled to the PC and B Port Control Decoder 18-2 coupled to the communications module CM; interrupt register and clear 18-5 to generate interrupts; control register 18-4 which allows B Port to know the relevant mode of operation; a 1K×8 RAM 18-9 which formulates read and write requests to and from the PC; normal input/output and status registers 18-6, eight one word registers accessable by both ports wih input words to the PC to report status and output words to control variable memory starting address; command byte 18-7 used to set up the relevant mode of operation (write or read) in 18-9 RAM; B Port Address decoder 18-3 and RAM Address Controller 18-8. The controller provides timing, decoding, memory and control functions to perform block transfers between the communications module and the PC and takes the form of a forty pin dual in line package. Controller 18 enables the CM to read and write data from a series 500 PC providing logic to allow up to eight data blocks of 128 bytes each to be transferred consecutively between the internal 1K×8 RAM, 18-9, and a series 500 PC. The controller provides the address control for the on board RAM while the starting block address is configurable from outside the controller. Controller 18 also provides five 8-bit status registers to identify the type of special function in which it resides which are configured from outside the controller. Controller 18 provides decode logic to interpret control bytes from a Series 500 PC and respond properly to subsequent control signals and execute the directed transfers. Controller 18 provides decode logic to interpret control bytes from a Series 500 PC and respond properly to subsequent control signals and execute the directed transfers. Controller 18 also provides logic to recognize interrupt conditions and forward these to the SF controlling devices, the CPU. In addition, the controller provides logic to accommodate a configurable normal I/O capability of up to eight Series 500 I/O points, either input or output, word or discrete.

Controller 18 provides two separate control interface ports A and B allowing two external devices (the CPU and the PC) independent control of reading and writing to internal registers and the internal 1K×8 RAM 18-9.

The A PORT interfaces to the PC and consists of an eight bit data bus A:D0 through A:D7(A PORT DATA BUS) bidirectional data lines over which data control or status information is transferred to and from the controller, a four bit channel address A:CA0-A:CA3, binary encoded lines which indicate the particular channel to be accessed used for reading various status register or for reading or writing normal word I/O data bytes, and six control signals. A low active signal on A:CS* (A PORT CHIP SELECT causes the controller to execute a data transfer over the A PORT DATA BUS. A control signal to controller 18 on A:ST*(A PORT DATA-STATUS SELECT) indicates whether the information to be transferred over the A PORT DATA BUS is data or status. A control signal to the controller 18 on A:WE* (A PORT READ-WRITE SELECT) indicates which direction to transfer the information on the A PORT DATA BUS. A control signal on A:IOC* (A PORT I/O CYCLE COMPLETE) indicates that the normal I/O cycle is complete on A PORT. A control signal on A:IOD (A PORT I/O DISABLE) disables normal outputs. An output signal from controller 18 on A: IOFAIL* informs the A PORT controller 18-2 that immediate services is requested. This is reset by reading the status register contents.

The B PORT provides signals that interface to the controlling CPU within the communications module CM and comprises B:D0-B:D7 (B PORT DATA BUS), eight data lines over which the controller 18 data and control is passed, B:AD0-B:AD6 (B PORT ADDRESS), seven address lines that identify the source or destination of B PORT data and control information and the following control signals. A signal on B:CS* (B PORT CHIP SELECT) enables controller 18 to interpret B PORT control signals. A control signal on B:WE* pulses low with B:CS* to write to controller 18. The master reset for the chip is active when both B:RD* and B:WE* are held low. A control signal on B:RD* (B PORT READ ENABLE) pulse low with B:SC* to read from controller 18. The master reset for the chip is active when both B:RD* and B:WE* are held low. A continuous clock signal, 2.5 mhz to 4 mhz is provided at B:CLK (B PORT CLOCK INPUT). An output signal on B:1NT* (B PORT INTERRUPT) informs the B PORT controller that its attention is needed. The cause of the interrupt is held in a readable interrupt register.

The B PORT 18-2 control decode decodes the seven B PORT address lines whenever the B:CS* pulses low and functions based upon the HEX address code.

The A PORT control decode 18-1 uses the conditions on the A PORT lines A:WE* and A:ST* to determine what action is required when A:CS* pulses low and functions based on these control lines and prior history.

Controller 18 performs data block transfers between RAM 18-9 and A PORT and data transfers between the normal I/O registers 18-6 and A PORT. The RAM address controller 18-8 drives the address lines of RAM 18-9 according to the Control Register 18-4 set up. Interrupt logic is provided by register 18-5 which are passed to B PORT by setting in appropriate bit an the register.

Figure 24:
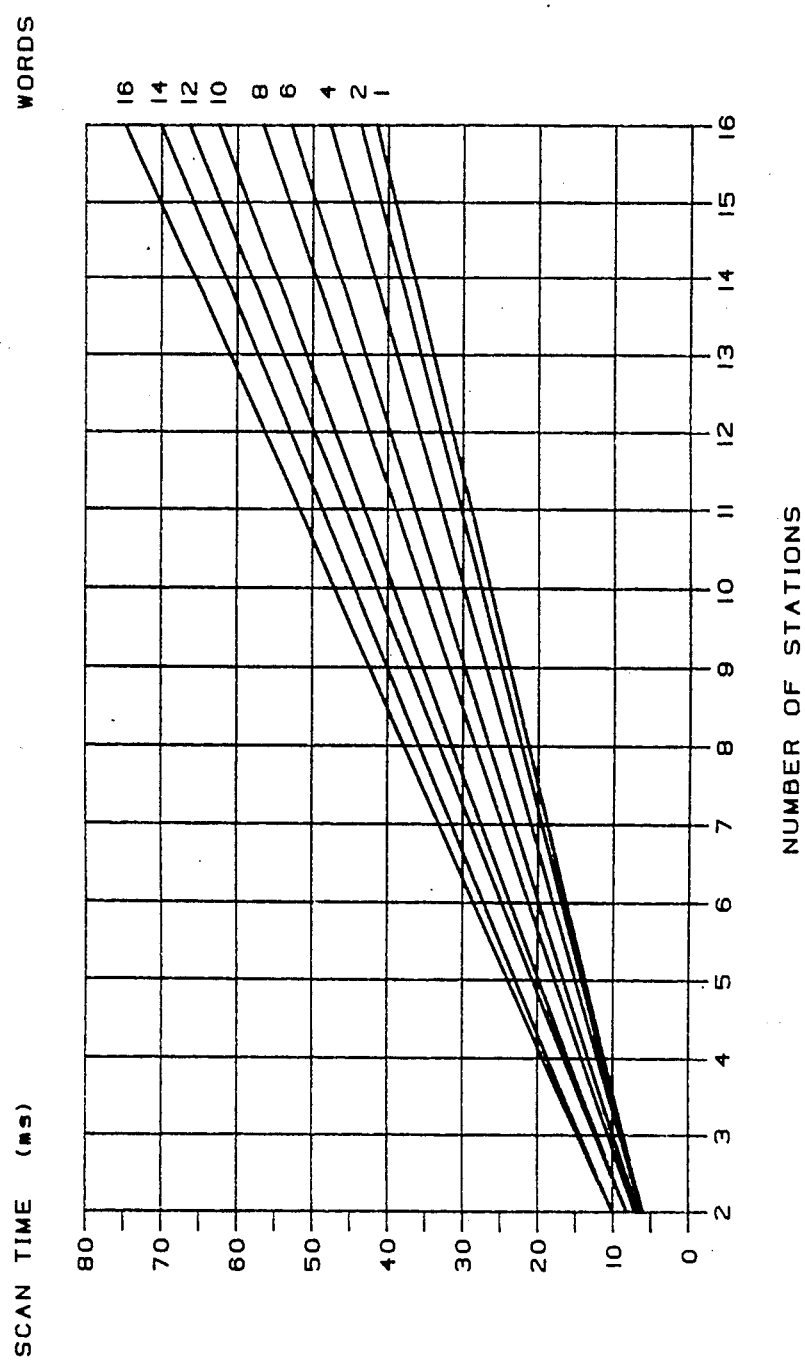
FIG. 24 is a graph showing scan times for the first embodiment of the invention.
Figure 25:
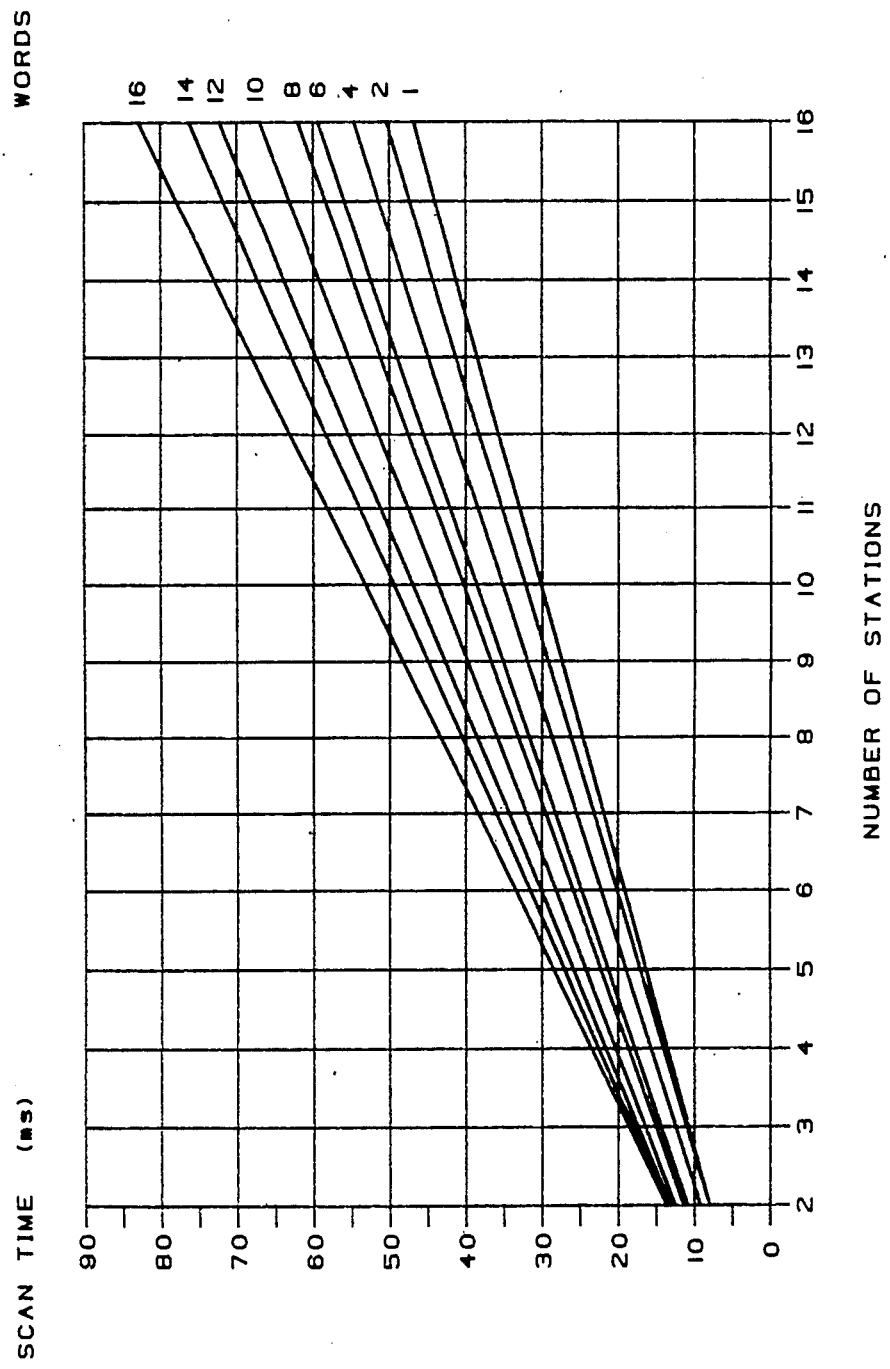
FIG. 25 is a graph showing scan times for the second embodiment of the invention.

FIGS. 24 and 25 show curves indicating network performance that is achieved by the broadcast bus for various numbers of nodes and numbers of words being transmitted per node, FIG. 24 showing performance for the first embodiment and FIG. 25 for the second embodiment. These curves reflect the values chosen for message timeouts and active monitor delays between received message and the next time slot assignments.

In view of the above it will be seen that in accordance with the invention a system and a method have been provided for communicating a small amount of data among PCs at a rate very close to the scan time of the PCs with assured data integrity and a high degree of reliability and which is significantly less costly then conventional SCADA approaches. The protocol employed in the invention includes both initialization and maintenance of the network in a manner which resolves conflicts among nodes for the right to transmit while assuring each node the opportunity to transmit its messages and providing for the addition and removal of nodes without conflict.

Use of a closed system structure in which length of the message frame is optimized, as in the poll and TSA commands which are very short since no data words are included, coupled with the fact that all messages are broadcast over the network for all nodes to receive results in efficient utilization of the bus bandwidth.

The two embodiments provide a choice of fault tolerance which can be selected to best meet a particular industrial process and factory environment in which the network will be employed.

Two embodiments of the invention have been described in detail. It is obvious that many additional changes and modifications can be made in the above-described details without departing from the nature and spirit of the invention, it is understood that the invention is not to be limited to said details except as set forth in the appended claims.

What is claimed is:

1. In a system for controlling a process using a network of distributed programmable controllers coupled to a communications bus each adapted to receive input information relating to the process, to determine appropriate output information based on the input information and to generate output signals to selected output devices to control the process, apparatus for controlling communications of tightly coupled information among the controllers comprising communication module means coupled between each programmable controller and the communications bus, each of the communication module means adapted to broadcast and receive data over the communications bus, each of the module means adapted to operate as an active monitor exercising exclusive control over broadcasting activity on the network granting in turn time slots to each other module means on the network enabling said each other module means to broadcast data during its respective time slot and each of the module means also being adapted to operate as a non-monitor adapted to broadcast data to all other module means on the network only when enabled by an active monitor, each of the communications module means being adapted to operate as a passive monitor which in addition to broadcasting data to all other module means in the network when enabled by the active monitor also continuously monitors broadcasting activity on the network and after a selected time interval of no broadcasting activity becomes an active monitor exercising exclusive control over broadcasting activity on the network, the system including timing means to provide an indication of the expiry of the selected time interval, means to select any one of the module means as a user selected active monitor and means to assign any selected one of the communication module means other than the active monitor as a passive monitor.

2. A method for controlling network bus communications for tightly coupled information among distributed programmable controllers coupled to a communications bus, each controller coupled to the communications bus at a node through a communications module adapted to broadcast and receive data over the communications bus, the communications module adapted to operate as an active monitor scanning the network and exercising exclusive control over broadcast activity on the network and a non-monitor adapted to broadcast data to all other modules on the network when enabled by the active monitor comprising the steps of designating only one of the modules as an active monitor to control communications on the bus, the active monitor upon energization in its first network scan broadcasting a poll to each of the modules coupled to the network to determine which are energized and active on the network, the polled module being enabled and broadcasting its data over the communications bus, the active monitor establishing a list of modules which respond to the poll as modules active on the network, the active module during each normal succeeding scan allocating a portion of the scan as a time slot allocation (TSA) for each module included in the list and broadcasting the TSA in turn to each listed module, the module receiving the TSA being enabled and broadcasting its data over the communications bus to every other module in the network.

3. A method for controlling network bus communications for tightly coupled information according to claim 2 in which there are n modules coupled to the communications bus and further including the step of broadcasting a poll to a single but different module each network scan so that all modules coupled to the network are checked once every n network scans to continuously update the list of modules active on the network.

4. A method for controlling network bus communications for tightly coupled information according to claim 2 in which the communications modules are also adapted to operate as a passive monitor which in addition to broadcasting data to all other modules on the network when enabled also can become an active monitor exercising exclusive supervisory control over broadcast activity on the network further including the steps of causing the active monitor to designate one of the remaining modules coupled to the network as a passive monitor, the passive monitor continuously monitoring the network for the presence of broadcast activity, the passive monitor timing each period wherein no broadcast activity occurs and upon the occurrence of an absence of such broadcast activity for a selected time interval the passive monitor assuming exclusive supervisory control of the broadcast activity of the network as an active monitor.

5. A method for controlling network bus communications for tightly coupled information according to claim 4 in which all the modules active in the network maintain a list of all the other modules active in the network and further including the step of the passive monitor which has assumed control of the broadcast activity of the network designating one of the remaining modules active on the network as a passive monitor.

6. A method for controlling network bus communications for tightly coupled information according to claim 2 in which the communications bus includes dual media and each communications module has a pair of ports, one of the pair of each module connected to one medium and the other of the pair of each module connected to the other medium and the step of broadcasting a poll includes sending the poll to each port of each module, the non-monitor modules being prepared to receive information on both media, the non-monitor being polled being enabled by the poll to respond by broadcasting its data over the same medium on which it received the poll, the active monitor comparing the number of responses on each medium and directing further broadcasting from all active units on the medium on which the greatest number of responses were received.

7. In a system for controlling a process using a network of distributed programmable controllers coupled to a communications bus each adapted to receive input information relating to the process, to determine appropriate output information based on the input information and to generate output signals to selected output devices to control the process, apparatus for controlling communications of tightly coupled information among the controllers comprising communication module means coupled between each programmable controller and the communications bus, each of the communication module means adapted to broadcast and receive data over the communications bus, one of the module means adapted to operate as an active monitor exercising exclusive control over broadcasting activity on the network granting in turn time slots to each other module means on the network enabling said each other module means to broadcast data during its respective time slot and each of the other module means adapted to operate as a non-monitor adapted to broadcast data to all other module means on the network only when enabled by the active monitor, each of the non-monitor modules also adapted to operate as a passive monitor which in addition to broadcasting data to all other module means in the network when enabled by the active monitor also continuously monitors broadcasting activity on the network and after a selected time interval of no broadcasting activity becomes an active monitor exercising exclusive control over broadcasting activity on the network, the system including timing means to provide an indication of the expiry of the selected time interval and means to assign one of the non-monitor modules as a passive monitor.

8. In a system according to claim 7 wherein the apparatus for controlling communications of tightly coupled information among the controllers in which the controllers include memory means comprising means to selectively choose the placement of such information in the memory means so that it is accessible to and from the communication module means.

9. In a system according to claim 7 wherein the apparatus for controlling communications of tightly coupled information among the controllers includes means to select from one to sixteen words which the communication module can transmit.

10. In a system according to claim 7 wherein the apparatus for controlling communications of tightly coupled information among the controllers includes communication driver means to send information in the form of message frames on the communications bus and further including circuit means to disable the communication device means in the event that the message frame exceeds a selected length.

11. In a system according to claim 7 wherein the apparatus for controlling communications of tightly coupled information among the controllers include word vertification means in which a code is appended to each data message by broadcasting controllers and each receiving controller accepts only data messages which have the appended code whereby given information received by a communications module is verified without acknowledging receipt of such given information.

12. A method for controlling network bus communications for tightly coupled information among distributed programmable controllers according to claim 2 including the step of reassigning a TSA to the next module on the list if a module does not broadcast its data within a given time out period to optimize efficient utilization of the network scan.

13. A method for controlling network bus communications for tightly coupled information among distributed programmable controllers according to claim 2 including the step of having each module validate information received by it and removing any active monitor from supervisory control of the network upon the occurrence of a selected number of consecutive information invalidations.

14. A method for controlling network bus communications for tightly coupled information among distributed programmable controllers according to claim 4 including the step of having the designated active monitor upon being removed from the network and later being reactivated on the network refrain from broadcasting until one of two events occurs, first a selected period of time occurs without the designated active monitor detecting any communications activity on the bus and second if communications activity is detected when the designated active monitor receives a poll addressed to itself at which time the designated active monitor resumes supervisory control over the network by responding to the poll with a command which designates the acting active monitor the role of passive monitor and cancels all other passive monitor rolls.

15. A method for controlling network bus communications for tightly coupled information among distributed programmable controllers according to claim 4 further including the step of having the active monitor reassign the role of passive monitor to another module in the event that the previously assigned passive monitor fails to respond to its TSA or poll.

16. A method for controlling network bus communications for tightly coupled information among distributed programmable controllers according to claim 15 including the step of having the module reassigned as passive monitor acknowledging its assignment and canceling all other passive monitor assignments so that only one module will be acting as passive monitor.

17. A method for controlling network bus communications for tightly coupled information among distributed programmable controllers according to claim 2 including the step of having each node establish and maintain a list of modules active on the network.

18. In a system according to claim 7 in which each module means includes switch means to select a different number of data words for each module means to broadcast over the network during its time slot.

19. In a system according to claim 18 in which the switch means can select any number of data words from one to sixteen.

20. A method for controlling network bus communications for tightly coupled information according to claim 2 in which each module is adapted to broadcast a selected number of data words during its time slot allocation independently of the number of words selected for other modules on the network.

21. A method for controlling network bus communications for tightly coupled information according to claim 20 in which the time required for a scan of the network by the active monitor is dependent upon the number of data words selected for broadcast by each module active in the network.

* * * * *